US012679262B2

(12) United States Patent
Fujiyama et al.

(10) Patent No.: US 12,679,262 B2
(45) Date of Patent: Jul. 14, 2026

(54) VEHICLE SEAT

(71) Applicants: TS TECH CO., LTD., Asaka (JP);
HONDA MOTOR CO., LTD., Tokyo
(JP)

(72) Inventors: Kento Fujiyama, Tochigi (JP); **Hiroki
Nakajima, Tochigi (JP); Hiromasa
Ueki, Tochigi (JP); Mizuki Shimura**,
Tochigi (JP); Eiichi Kishimoto, Tokyo
(JP); Masaaki Yamaguchi, Tokyo (JP);
Yasuhiro Tsuji, Tokyo (JP); **Kohei
Fukuoka, Tokyo (JP); Hikaru Arai**,
Tokyo (JP)

(73) Assignees: TS TECH CO., LTD., Asaka (JP);
HONDA MOTOR CO., LTD., Tokyo
(JP)

( * ) Notice: Subject to any disclaimer, the term of this
patent is extended or adjusted under 35
U.S.C. 154(b) by 144 days.

(21) Appl. No.: 18/711,194

(22) PCT Filed: Nov. 10, 2022

(86) PCT No.: PCT/JP2022/041939
§ 371 (c)(1),
(2) Date: May 17, 2024

(87) PCT Pub. No.: WO2023/095633
PCT Pub. Date: Jun. 1, 2023

(65) Prior Publication Data
US 2025/0001921 A1     Jan. 2, 2025

(30) Foreign Application Priority Data

Nov. 25, 2021   (JP) ................................. 2021-191377
Nov. 25, 2021   (JP) ................................. 2021-191383

(51) Int. Cl.
*B60N 2/68* (2006.01)
*B60N 2/58* (2006.01)
*B60R 21/207* (2006.01)

(52) U.S. Cl.
CPC ............. *B60N 2/68* (2013.01); *B60N 2/5833*
(2013.01); *B60R 21/207* (2013.01)

(58) Field of Classification Search
CPC ........ B60N 2/68; B60N 2/5833; B60R 21/207
(Continued)

(56) References Cited

U.S. PATENT DOCUMENTS 8,690,255 B2 *   4/2014   Yamaki ................. B60N 2/667
                                                    297/452.52
9,010,855 B2 *   4/2015   Yamaki ................... B60N 2/22
                                                    297/216.13
(Continued)

FOREIGN PATENT DOCUMENTS

EP          3967558 A1 *   3/2022   ........... B60R 21/217
JP          5169864 B2       3/2013
(Continued)

OTHER PUBLICATIONS

Written Opinion for PCT Patent Application No. PCT/
JP2022041939 mailed Jan. 24, 2023; 7 pp.

*Primary Examiner* — Jose V Chen
(74) *Attorney, Agent, or Firm* — Armstrong Teasdale LLP

(57) ABSTRACT

A vehicle seat includes an outer frame forming a framework
of a seatback, a frame bracket coupled to a left or right side
part of the outer frame, a module bracket fastened to the
frame bracket for supporting an airbag module, a shape
former coupled to the side part of the outer frame to form an
outer shape of the seatback, wherein gap spaces are formed
between the outer frame and the shape former, and the frame
(Continued)

bracket and the module bracket are fastened to each other at fastening points frontward of the gap spaces.

14 Claims, 24 Drawing Sheets

(58) Field of Classification Search
USPC ...................................................... 297/452.18
See application file for complete search history.

(56) References Cited

U.S. PATENT DOCUMENTS

| 11,491,944 B2 * | 11/2022 | Tanabe ...................... B60N 2/68 |
| 11,787,359 B2 | 10/2023 | Tanabe et al. |
| 2013/0320742 A1 * | 12/2013 | Murolo ................... B60N 2/682 |
| | | 264/279 |
| 2015/0076885 A1 * | 3/2015 | Stone ........................ B60N 2/68 |
| | | 280/730.2 |
| 2017/0225640 A1 * | 8/2017 | Ohno .................... B60R 21/264 |
| 2018/0022304 A1 * | 1/2018 | Yoshikai .............. B60N 2/5883 |
| | | 280/728.3 |
| 2019/0176741 A1 * | 6/2019 | Inoue ................ B60R 21/23138 |
| 2023/0373366 A1 * | 11/2023 | Tanabe ................. B60R 21/207 |
| 2024/0001882 A1 | 1/2024 | Tanabe et al. |

FOREIGN PATENT DOCUMENTS

| JP | 2019182111 A | 10/2019 |
| JP | 2021185078 A * | 12/2021 |

* cited by examiner (B)

(A)

(A)

(B)

front left ← → right rear

VEHICLE SEAT

CROSS-REFERENCE TO RELATED APPLICATIONS

This application is a U.S. National Phase Application of PCT/JP2022/041939, filed on Nov. 10, 2022, which claims the benefit of priority to Japanese Patent Application No. 2021-191383, filed Nov. 25, 2021 and Japanese Patent Application No. 2021-191377 filed Nov. 25, 2021. The contents of these applications are hereby expressly incorporated by reference in their entirety.

TECHNICAL FIELD

The present invention relates to a vehicle seat equipped with an airbag.

BACKGROUND ART

Known vehicle seats include a vehicle seat for a rear seat that is equipped with an airbag module in a seatback, and is displaceable between an upright position in which the seatback is upright and functions as a backrest and a retracted position in which the seatback is folded frontward and the rear side of the seatback is continuous with a vehicle floor (See Patent Document 1, for example). In Patent Document 1, the seatback of the vehicle seat includes a back frame for forming a framework of the seatback and a plate-shaped back panel coupled to the rear side of the back frame. The back frame is formed by the bending of a metal pipe member into a generally rectangular shape, and the back panel is a generally square-shaped plate that covers the rear side of the pipe member.

The back panel includes an expansion section at an outer edge, extending beyond the rear side of the back frame toward the outside. The expansion section has a plurality of bosses protruding toward the back frame, and an airbag module is fastened to the end faces of the bosses.

PRIOR ART DOCUMENT(S)

Patent Document(s)

Patent Document 1: JP5169864B

SUMMARY OF THE INVENTION

Task to be Accomplished by the Invention

The vehicle seat of Patent Document 1 includes the expansion section of the back panel, which causes a problem that the seatback is made heavier. However, when an airbag module is provided on the side frame without the expansion section, an outer shape of a seatback is determined by the shape of the airbag module, which causes a problem of difficulty in forming the outer shape of the seatback as intended.

The present invention has been made in view of these problems of the prior art, and a primary object of the present invention is to provide a vehicle seat that enables an airbag module to be fastened to an outer frame of a seatback frame, while enabling the outer shape of a seatback to be formed as intended.

Means to Accomplish the Task

An aspect of the present invention provides a vehicle seat comprising: an outer frame of a seatback frame, the outer frame forming a framework of a seatback and including a side part on one side in a left-right direction of the vehicle seat; a frame bracket coupled to the side part of the outer frame; a module bracket fastened to the frame bracket and configured to support an airbag module; and a shape former coupled to the side part of the outer frame, the shape former being a member that forms an outer shape of the seatback, wherein one or more gap spaces are formed between the side part of the outer frame and the shape former, and wherein the frame bracket and the module bracket are fastened to each other at one or more fastening points frontward of the gap spaces.

In this configuration, the outer shape of the seatback is enabled to be formed to suit a use environment and other conditions by the shape former. Furthermore, the gap spaces are formed between the shape former and the seatback frame outer portion, which enables an assembling worker to access the one or more fastening points, at which the frame bracket is fastened to the module bracket through the gap spaces from the rear side. As a result, the worker is enabled to insert a fastening tool into the gap spaces from the rear in order to fasten the frame bracket to the module bracket, thereby coupling the airbag module to the seatback frame outer portion.

The above vehicle seat may be further configured such that the airbag module and the frame bracket are fastened to each other at two or more fastening points, and wherein the two or more fastening points are located frontward of the gap spaces.

In this configuration, the airbag module and the frame bracket are fastened to each other at a plurality of fastening points, which enables a tighter coupling therebetween. Moreover, the fastening points are located frontward of the gap spaces, which enables an assembling worker to insert the fastening tool from the rear, thereby fastening the airbag module to the frame bracket.

The above vehicle seat may be further configured such that a top or lower edge of the module bracket is visible from the rear through the gap spaces.

In this configuration, the upper or lower edge of the module bracket is visible from the rear through the gap spaces between the left side frame and the shape former, which enables an assembling worker to accurately grasp the position of the module bracket when assembling the airbag module. As a result, the worker is enabled to easily place the airbag module at the proper position, which improves the efficiency of the work of assembling the airbag module.

The above vehicle seat may be further configured such that a top edge and a lower edge of the module bracket are visible from the rear through the gap spaces, wherein a top edge and a lower edge of the frame bracket are visible from the rear through the gap spaces, and wherein a vertical size of the module bracket is the same as that of the frame bracket.

This configuration enables an assembling worker to easily and accurately grasp the vertical positions of the module bracket and the frame bracket through the through-hole space. This feature enables the worker to easily position the module bracket and the frame bracket in alignment with each other, thereby improving the efficiency of the work of assembling the module bracket.

The above vehicle seat may be further configured such that the shape former is a curved wire member.

This configuration enables the shape former to be made lighter, and simplifies the structure of the shape former.

The above vehicle seat may be further configured such that the vehicle seat further comprises a pan frame coupled to the rear side of the outer frame and including a protrusion section protruding from an upper portion of the pan frame on the one side in the left-right direction, the protrusion section extending outward beyond an upper portion of the side part of the outer frame, wherein the shape former includes a portion extending between a lower edge of the protrusion section and a lower portion of the side part of the outer frame, wherein a through-hole space extending in a front-rear direction of the vehicle seat is defined by the lower edge of the protrusion section, the shape former, and the lower portion of the side part of the outer frame, and wherein the frame bracket and the module bracket are fastened to each other at the one or more fastening points frontward of the through-hole space.

This configuration enables an assembling worker to insert a fastening tool into the through-hole space, thereby fastening the frame bracket to the module bracket.

The above vehicle seat may be further configured such that the vehicle seat further comprises a pad member (21) that extends over and covers outer sides of the outer frame and the airbag module, wherein the shape former is in contact with an inner surface of the pad member.

In this configuration, the shape former is in contact with an inner side surface of the pad member, enabling the shape former to support the inner side of the seatback, which enables the proper positioning of the pad member, and the formation of the outer shape of the seatback.

The above vehicle seat may be further configured such that the outer frame includes two side frames on the left and right sides thereof, and an upper frame connecting the two side frames, wherein the shape former includes a shape former upper portion and a shape former lower portion which are both connected to, and extend outward from a side frame, the side frame being one of the two side frames on the one side, and a shape former center portion connecting the shape former upper portion and the shape former lower portion, wherein the shape former upper portion is provided with an upper attachment section coupled to the side frame, and wherein the upper attachment section is located frontward of the protrusion section.

In this configuration, the upper attachment section is covered from the rear by the protrusion section, which provides the protection of the upper attachment section.

The above vehicle seat may be further configured such that an inner end part of the shape former includes a curved section that is curved and extending downward, and wherein the upper attachment section is provided in the curved section.

In this configuration, the curved section is curved to extend downward. As a result, the upper portion of the shape former does not protrude upward so much compared to the curved section curved to extend upward, which reduces the vertical size of the shape former.

The above vehicle seat may be further configured such that the side frame has a bead, and wherein a lower end part of the shape former is joined to the side frame at a location rearward of the bead.

In this configuration, the bead provides the increased stiffness to the side frame. As the lower portion of the shape former is joined to the rear side of the stiffened portion of the side frame, the side frame is enabled to support the shape former in a more secure manner.

The above vehicle seat may be further configured such that the side frame includes a side frame lower portion formed by a sheet metal member having left and right surfaces facing away from each other in the left-right direction, wherein the side frame lower portion includes a frame bend section in which the side frame lower portion is bent inward; and wherein a lower end part of the shape former is coupled to the side frame at a location below the frame bend section.

In this configuration, the side frame has a frame bend section in which the side frame is bent inward, and the lower portion of the shape former is coupled to the side frame at a location below the bend section. As a result, the lower part of the seatback is made with a reduced width in the left-right direction, enabling the seatback to be formed so as to conform to the shape of a human body.

The above vehicle seat may be further configured such that the shape former center portion of the shape former at least partially extends along an outer side surface of the airbag module, as viewed from the rear.

This configuration prevents the formation of a gap between the shape former center portion and the outer side surface of the airbag module, thereby enabling the seatback to be formed with a less stepped front surface, which improves the appearance of the seatback.

The above vehicle seat may be further configured such that the shape former center portion of the shape former at least partially extends along an outer edge of the pan frame.

In this configuration, the shape former extends along the outer edge of the protrusion section of the pan frame. As a result, the shape former reinforces the edge of the protrusion section of the pan frame, which increases the stiffness of the seatback frame.

The above vehicle seat may be further configured such that the vehicle seat further comprises a skin cover provided on an outer surface of the pad member; a cloth-hook wire configured to be engagedly attached to the frame bracket; and a stay cloth configured to connect the cloth-hook wire to the skin cover, wherein the cloth-hook wire is engagedly coupled to the stay cloth at a location frontward of the through-hole space.

This configuration enables an assembling worker to make a visual check of the coupling between the cloth-hook wire and the stay cloth visible, which facilitates the work of assembling the vehicle seat.

The above vehicle seat may be further configured such that the shape former and the airbag module are arranged to be spaced apart from each other in the front-rear direction so as to form a gap space therebetween.

This configuration enables an assembling worker to easily place the airbag module without being obstructed by the shape former when assembling the airbag module, which improves the efficiency of the work of assembling the vehicle seat.

Patent Document 1 (JP5169864B) teaches a vehicle seat for a rear seat equipped with a front-deploying airbag within a seatback. In Patent Document 1, the vehicle seat comprises a pair of side frames forming a framework of a seatback, an airbag module attached to a side frame, a stay cloth for transferring a stress caused by airbag inflation to a tear-off part in a skin cover during the deployment of the airbag; and one or more wire members for connecting the stay cloth to the side frame. Both ends of each wire member are latched into or hung onto through holes defined in the side frame or an edge thereof.

In such a vehicle seat, the wire members are preferably coupled to the stay cloth at locations close to the front edge of the side frame, in order to properly control the direction of the deployment of the airbag. Moreover, the wire members are preferably coupled to the side frame at locations further closer to the front edge of the side frame, in order to effectively transfer the loads applied to the wire members to the side frame during the deployment of the airbag.

The vehicle seat is assembled by a process including placing a cushioning pad member on the front side of the side frame, and then placing a skin cover over the pad member. However, when the coupling between the wire members and the side frame is located close to the front edge of the side frame, it is difficult to check whether the wire members are properly latched into or hung onto the side frame after the pad member is placed on the front side of the side frame.

Thus, one task to be accomplished is to configure a vehicle seat including an airbag module, a stay cloth, and one or more wire members for coupling the stay cloth to a side frame, so as to enable an assembling worker to easily make a visual check of the coupling between the wire members and the side frame during assembly.

As a solution to accomplish the above-described task, the present invention provides a vehicle seat (401) comprising: a seat frame (409) including a pair of left and right side frames (417) on the left and right sides of the vehicle seat; a bracket (450) including a bracket coupler portion (455) configured to be coupled to a side frame that is one of the left and right side frames so as to extend outward from the side frame, and a bracket flat portion (456) having a plate shape and extending frontward from a lateral edge of the bracket coupler portion and defining hang holes extending through the bracket flat portion in a left-right direction; a wire member having hook sections (465) configured to be latched into or hung onto the hang holes, and extension sections (466) extending frontward from the hook sections along an outer surface of the bracket flat portion; a retainer (452) including a retainer coupler portion (470) configured to be coupled to the one of the side frames or to the bracket coupler portion, and extending over and along the outer side of the bracket flat portion and a retainer flat portion (471) extending frontward from the retainer coupler portion and over the outer side of the bracket flat portion, the retainer flat portion (471) facing the outer side of the bracket flat portion with the wire member located therebetween; an airbag module (412) coupled to the outer surface of the retainer flat portion; a pad member (410) supported on the front side of the seat frame; a skin cover (411) for covering the front surface of the pad member; and a stay cloth (442) having one end sewn to the skin cover and the other end engagedly attached to the extension sections of the wire member, wherein the retainer coupler portion (470) and the bracket coupler portion (455) are shaped to have respective cutouts (460, 480) extending therethrough in a front-rear direction, the cutouts being located rearward of the hang holes.

In this configuration, the retainer coupler portion and the bracket coupler portion are shaped to have the respective cutouts extending therethrough in the front-rear direction, the cutouts being located to be in alignment with the hang holes, which enables an assembling worker to easily make a visual check of whether the hook sections are latched into or hung onto the hang holes, from the rear of the retainer and the bracket. As a result, the worker is allowed to easily check whether the wire member has been properly coupled to the side part of the frame during assembly.

The above vehicle seat may be further configured such that the bracket has a bracket front end section (459) which extends inward from the front edge of the bracket flat portion and is configured to be in contact with the front side of the side frame.

This configuration ensures the secure coupling between the bracket and the side frame. As a result, the airbag module is more firmly supported by the side frame, which stabilizes the direction of the airbag deployment.

The above vehicle seat may be further configured such that the bracket is integrally formed with a side frame.

In this configuration, the vehicle seat is comprised of a smaller number of components or parts, and thus the vehicle seat is made simple.

The above vehicle seat may be further configured such that the bracket coupler portion has a bracket coupler contact section (457) configured to contact the rear surface of the side frame, and a bracket coupler slope section (458) extending diagonally frontward from the outer edge of the bracket coupler contact section. The bracket flat portion is connected to the front edge of the bracket coupler slope section, and the retainer coupler portion is fastened to the outer surface of the bracket coupler slope section.

When the airbag deploys, a rearward reaction force is applied to the coupling from the airbag. In this configuration, the bracket coupler slope section in the bracket coupler portion ensures that the coupling counters the rearward reaction force from the airbag, which helps the airbag deploy more properly. In addition, the bracket coupler slope section extends diagonally frontward from the outer edge of the bracket coupler contact section, which enables the retainer coupler portion to be fastened to the bracket coupler slope section from the rear of the bracket and the retainer. This feature also reduces the amount of protrusion of the bracket and the retainer from the outer side frames, thereby reducing the width of the vehicle seat in the left-right direction.

The above vehicle seat may be further configured such that a stay cloth coupling section (468) onto which the stay cloth is to be hung, is provided to extend between the front ends of the extension sections, such that the stay cloth coupling section is located frontward of the front edges of the retainer flat portion and the bracket flat portion.

In this configuration, the stay cloth coupling section is located frontward of the front edges of the retainer flat portion and the bracket flat portion, which enables an assembling worker to easily hand the stay cloth onto the stay cloth coupling section, without being obstructed by the retainer flat portion and the bracket flat portion.

The above vehicle seat may be further configured such that the stay cloth coupling section is provided outwardly apart from the hook sections.

In this configuration, the stay cloth coupling section is located away from the side frame and thus less likely to contact the side frame, which prevents abnormal noise from occurring due to contact between the stay cloth coupling section and the side frame.

The above vehicle seat may be further configured such that the stay cloth coupling section is in contact with the inner side of the airbag module.

In this configuration, the stay cloth coupling section is brought into contact with a side of the airbag module, which prevents the stay cloth coupling section from making a rocking motion. As a result, the stay cloth coupling section is less likely to contact the side frame, which prevents abnormal noise from occurring due to contact between the stay cloth coupling section and the side frame.

As another solution to accomplish the above-described task, the present invention provides an airbag module support structure (423) for a vehicle seat, the airbag module support structure comprising: a bracket (450) including a bracket coupler portion (455) configured to be coupled to a side part of a frame (409), the frame forming a framework of the vehicle seat, on one side in a left-right direction of the vehicle seat so as to extend outward from the frame, and a bracket flat portion (456) having a plate shape and extending frontward from a lateral edge of the bracket coupler portion and defining hang holes extending through the bracket flat portion in the left-right direction; a wire member having hook sections (465) configured to be latched into or hung onto the hang holes, and extension sections (466) extending frontward from the hook sections along an outer surface of the bracket flat portion; and a retainer (452) including a retainer coupler portion (470) configured to be coupled to the side part of the frame or to the bracket coupler portion and extending over and along the outer side of the bracket flat portion, and a retainer flat portion (471) extending frontward from the retainer coupler portion and over the outer side of the bracket flat portion, the retainer flat portion (471) facing the outer side of the bracket flat portion with the wire member located therebetween; wherein the retainer coupler portion and the bracket coupler portion are shaped to have respective cutouts (460, 480) extending therethrough in a front-rear direction, the cutouts being located to be in alignment with the hang holes.

In this configuration, the retainer coupler portion and the bracket coupler portion are shaped to have the respective cutouts extending therethrough in the front-rear direction such that the cutouts are located to be in alignment with the hang holes, which enables an assembling worker to easily make a visual check of whether the hook sections are latched into or hung onto the hang holes, from the rear of the retainer and the bracket. As a result, the worker is allowed to easily check whether the wire member is properly coupled to the side part of the frame during assembly.

As a further solution to accomplish the above-described task, the present invention provides a method for assembling a vehicle seat (401), wherein the vehicle seat comprises: a seat frame (409) including a pair of left and right side frames (417); a bracket (450) including a bracket coupler portion (455) configured to be coupled to a side frame on one side in a left-right direction of the vehicle seat so as to extend outward from the side frame, and a bracket flat portion (456) having a plate shape and extending frontward from a lateral edge of the bracket coupler portion and defining hang holes extending through the bracket flat portion in the left-right direction; a wire member having hook sections (465) configured to be latched into or hung onto the hang holes, and extension sections (466) extending frontward from the hook sections along an outer surface of the bracket flat portion; a retainer (452) including a retainer coupler portion (470) configured to be coupled to the one of the side frames or to the bracket coupler portion, and extending over and along the outer side of the bracket flat portion and a retainer flat portion (471) extending frontward from the retainer coupler portion and over the outer side of the bracket flat portion, the retainer flat portion (471) facing the outer side of the bracket flat portion with the wire member located therebetween; wherein the retainer coupler portion and the bracket coupler portion are shaped to have respective cutouts (460, 480) extending therethrough in a front-rear direction, the cutouts being located to be in alignment with the hang holes, the method comprising the steps, in order, of latching the hook sections of the wire member into the hang holes; and coupling the retainer coupler portion to the side frame or the bracket coupler portion.

In this configuration, the retainer coupler portion and the bracket coupler portion are shaped to have the respective cutouts extending therethrough in the front-rear direction, the cutouts being located to be in alignment with the hang holes, which enables an assembling worker to, after assembly of the seat frame, easily make a visual check of whether the hook sections are latched into or hung onto the hang holes, from the rear of the retainer and the bracket. As a result, the worker is allowed to easily check whether the wire member has been properly coupled to the side frame during assembly.

Effect of the Invention

In the above-described configurations, one provides a vehicle seat comprising: an outer frame of a seatback frame, the outer frame forming a framework of a seatback and including a side part on one side in a left-right direction of the vehicle seat; a frame bracket coupled to the side part of the outer frame; a module bracket fastened to the frame bracket and configured to support an airbag module; and a shape former coupled to the side part of the outer frame, the shape former being a member that forms an outer shape of the seatback, wherein one or more gap spaces are formed between the side part of the outer frame and the shape former, and wherein the frame bracket and the module bracket are fastened to each other at one or more fastening points frontward of the gap spaces. In this configuration, the outer shape of the seatback is enabled to be formed to suit a use environment and other conditions by the shape former. Furthermore, the gap spaces are formed between the shape former and the seatback frame outer portion, which enables an assembling worker to access the one or more fastening points, at which the frame bracket is fastened to the module bracket through the gap spaces from the rear side. As a result, the worker is enabled to insert a fastening tool into the gap spaces from the rear in order to fasten the frame bracket to the module bracket, thereby coupling the airbag module to the seatback frame outer portion.

The above vehicle seat may be further configured such that the airbag module and the frame bracket are fastened to each other at two or more fastening points, and wherein the two or more fastening points are located frontward of the gap spaces. In this configuration, the airbag module and the frame bracket are fastened to each other at a plurality of fastening points, which enables a tighter coupling therebetween. Moreover, the fastening points are located frontward of the gap spaces, which enables an assembling worker to insert the fastening tool from the rear, thereby fastening the airbag module to the frame bracket.

The above vehicle seat may be further configured such that a top or lower edge of the module bracket is visible from the rear through the gap spaces. In this configuration, the upper or lower edge of the module bracket is visible from the rear through the gap spaces between the left side frame and the shape former, which enables an assembling worker to accurately grasp the position of the module bracket when assembling the airbag module. As a result, the worker is enabled to easily place the airbag module at the proper position, which improves the efficiency of the work of assembling the airbag module.

The above vehicle seat may be further configured such that a top edge and a lower edge of the module bracket are visible from the rear through the gap spaces, wherein a top edge and a lower edge of the frame bracket are visible from the rear through the gap spaces, and wherein a vertical size of the module bracket is the same as that of the frame bracket. This configuration enables an assembling worker to easily and accurately grasp the vertical positions of the module bracket and the frame bracket through the through-hole space. This feature enables the worker to easily position the module bracket and the frame bracket in alignment with each other, thereby improving the efficiency of the work of assembling the module bracket.

The above vehicle seat may be further configured such that the shape former is a curved wire member. This configuration enables the shape former to be made lighter, and simplifies the structure of the shape former.

The above vehicle seat may be further configured such that the vehicle seat further comprises a pan frame coupled to the rear side of the outer frame and including a protrusion section protruding from an upper portion of the pan frame on the one side in the left-right direction, the protrusion section extending outward beyond an upper portion of the side part of the outer frame, wherein the shape former includes a portion extending between a lower edge of the protrusion section and a lower portion of the side part of the outer frame, wherein a through-hole space extending in a front-rear direction of the vehicle seat is defined by the lower edge of the protrusion section, the shape former, and the lower portion of the side part of the outer frame, and wherein the frame bracket and the module bracket are fastened to each other at the one or more fastening points frontward of the through-hole space. This configuration enables an assembling worker to insert a fastening tool into the through-hole space, thereby fastening the frame bracket to the module bracket.

The above vehicle seat may be further configured such that the vehicle seat further comprises a pad member that extends over and covers outer sides of the outer frame and the airbag module, wherein the shape former is in contact with an inner surface of the pad member. In this configuration, the shape former is in contact with an inner side surface of the pad member, enabling the shape former to support the inner side of the seatback, which enables the proper positioning of the pad member, and the formation of the outer shape of the seatback.

The above vehicle seat may be further configured such that the outer frame includes two side frames on the left and right sides thereof, and an upper frame connecting the two side frames, wherein the shape former includes a shape former upper portion and a shape former lower portion which are both connected to, and extend outward from a side frame, the side frame being one of the two side frames on the one side, and a shape former center portion connecting the shape former upper portion and the shape former lower portion, wherein the shape former upper portion is provided with an upper attachment section coupled to the side frame, and wherein the upper attachment section is located frontward of the protrusion section. In this configuration, the upper attachment section is covered from the rear by the protrusion section, which provides the protection of the upper attachment section.

The above vehicle seat may be further configured such that an inner end part of the shape former includes a curved section that is curved and extending downward, and wherein the upper attachment section is provided in the curved section. In this configuration, the curved section is curved to extend downward. As a result, the upper portion of the shape former does not protrude upward so much compared to the curved section curved to extend upward, which reduces the vertical size of the shape former.

The vehicle seat may be configured such that the outer frame includes a pair of side frames on the left and right of the outer frame, and an upper frame connecting the two side frames, wherein the shape former includes a shape former upper portion and a shape former lower portion which are both connected to and extend outward from one of the two side frames, and a shape former center portion connecting the shape former upper portion and the shape former lower portion, and wherein the shape former upper portion is curved and extends downward as viewed from the front, and has an upper attachment section at an inner end of the shape former so that the upper attachment section extends downward and is coupled to the one of the two side frames. In this configuration, the upper portion of the shape former is provided with the upper inner end extending downward, and thus does not protrude upward so much compared to the upper portion of the shape former curved to extend upward, which reduces the vertical size of the shape former.

The above vehicle seat may be further configured such that the side frame has a bead, and wherein a lower end part of the shape former is joined to the side frame at a location rearward of the bead. In this configuration, the bead provides the increased stiffness to the side frame. As the lower portion of the shape former is joined to the rear side of the stiffened portion of the side frame, the side frame is enabled to support the shape former in a more secure manner.

The above vehicle seat may be further configured such that the side frame includes a side frame lower portion formed by a sheet metal member having left and right surfaces facing away from each other in the left-right direction, wherein the side frame lower portion includes a frame bend section in which the side frame lower portion is bent inward; and wherein a lower end part of the shape former is coupled to the side frame at a location below the frame bend section. In this configuration, the side frame has a frame bend section in which the side frame is bent inward, and the lower portion of the shape former is coupled to the side frame at a location below the bend section. As a result, the lower part of the seatback is made with a reduced width in the left-right direction, enabling the seatback to be formed so as to conform to the shape of a human body.

The above vehicle seat may be further configured such that the shape former center portion of the shape former at least partially extends along an outer side surface of the airbag module, as viewed from the rear. This configuration prevents the formation of a gap between the shape former center portion and the outer side surface of the airbag module, thereby enabling the seatback to be formed with a less stepped front surface, which improves the appearance of the seatback.

The above vehicle seat may be further configured such that the shape former center portion of the shape former at least partially extends along an outer edge of the pan frame. In this configuration, the shape former extends along the outer edge of the protrusion section of the pan frame. As a result, the shape former reinforces the edge of the protrusion section of the pan frame, which increases the stiffness of the seatback frame.

The above vehicle seat may be further configured such that the vehicle seat further comprises a skin cover provided on an outer surface of the pad member; a cloth-hook wire configured to be engagedly attached to the frame bracket; and a stay cloth configured to connect the cloth-hook wire to the skin cover, wherein the cloth-hook wire is engagedly coupled to the stay cloth at a location frontward of the through-hole space. This configuration enables an assembling worker to make a visual check of the coupling between the cloth-hook wire and the stay cloth visible, which facilitates the work of assembling the vehicle seat.

The above vehicle seat may be further configured such that the shape former and the airbag module are arranged to be spaced apart from each other in the front-rear direction so as to form a gap space therebetween. This configuration enables an assembling worker to easily place the airbag module without being obstructed by the shape former when assembling the airbag module, which improves the efficiency of the work of assembling the vehicle seat.

In the above-described configurations, one provides a vehicle seat (401) comprising: a seat frame (409) including a pair of left and right side frames (417) on the left and right sides of the vehicle seat; a bracket (450) including a bracket coupler portion (455) configured to be coupled to a side frame that is one of the left and right side frames so as to extend outward from the side frame, and a bracket flat portion (456) having a plate shape and extending frontward from a lateral edge of the bracket coupler portion and defining hang holes extending through the bracket flat portion in a left-right direction; a wire member having hook sections (465) configured to be latched into or hung onto the hang holes, and extension sections (466) extending frontward from the hook sections along an outer surface of the bracket flat portion; a retainer (452) including a retainer coupler portion (470) configured to be coupled to the one of the side frames or to the bracket coupler portion, and extending over and along the outer side of the bracket flat portion and a retainer flat portion (471) extending frontward from the retainer coupler portion and over the outer side of the bracket flat portion, the retainer flat portion (471) facing the outer side of the bracket flat portion with the wire member located therebetween; an airbag module (412) coupled to the outer surface of the retainer flat portion; a pad member (410) supported on the front side of the seat frame; a skin cover (411) for covering the front surface of the pad member; and a stay cloth (442) having one end sewn to the skin cover and the other end engagedly attached to the extension sections of the wire member, wherein the retainer coupler portion (470) and the bracket coupler portion (455) are shaped to have respective cutouts (460, 480) extending therethrough in a front-rear direction, the cutouts being located rearward of the hang holes. In this configuration, the retainer coupler portion and the bracket coupler portion are shaped to have the respective cutouts extending therethrough in the front-rear direction, the cutouts being located to be in alignment with the hang holes, which enables an assembling worker to easily make a visual check of whether the hook sections are latched into or hung onto the hang holes, from the rear of the retainer and the bracket. As a result, the worker is allowed to easily check whether the wire member has been properly coupled to the side part of the frame during assembly.

The above vehicle seat may be further configured such that the bracket has a bracket front end section (459) which extends inward from the front edge of the bracket flat portion and is configured to be in contact with the front side of the side frame. This configuration ensures the secure coupling between the bracket and the side frame. As a result, the airbag module is more firmly supported by the side frame, which stabilizes the direction of the airbag deployment.

The above vehicle seat may be further configured such that the bracket is integrally formed with a side frame. In this configuration, the vehicle seat is comprised of a smaller number of components or parts, and thus the vehicle seat is made simple.

The above vehicle seat may be further configured such that the bracket coupler portion has a bracket coupler contact section (457) configured to contact the rear surface of the side frame, and a bracket coupler slope section (458) extending diagonally frontward from the outer edge of the bracket coupler contact section. The bracket flat portion is connected to the front edge of the bracket coupler slope section, and the retainer coupler portion is fastened to the outer surface of the bracket coupler slope section. Thus, when the airbag deploys, a rearward reaction force is applied to the coupling from the airbag. In this configuration, the bracket coupler slope section in the bracket coupler portion ensures that the coupling counters the rearward reaction force from the airbag, which helps the airbag deploy more properly. In addition, the bracket coupler slope section extends diagonally frontward from the outer edge of the bracket coupler contact section, which enables the retainer coupler portion to be fastened to the bracket coupler slope section from the rear of the bracket and the retainer. This feature also reduces the amount of protrusion of the bracket and the retainer from the outer side frames, thereby reducing the width of the vehicle seat in the left-right direction.

The above vehicle seat may be further configured such that a stay cloth coupling section (468) onto which the stay cloth is to be hung, is provided to extend between the front ends of the extension sections, such that the stay cloth coupling section is located frontward of the front edges of the retainer flat portion and the bracket flat portion. In this configuration, the stay cloth coupling section is located frontward of the front edges of the retainer flat portion and the bracket flat portion, which enables an assembling worker to easily hand the stay cloth onto the stay cloth coupling section, without being obstructed by the retainer flat portion and the bracket flat portion.

The above vehicle seat may be further configured such that the stay cloth coupling section is provided outwardly apart from the hook sections. In this configuration, the stay cloth coupling section is located away from the side frame and thus less likely to contact the side frame, which prevents abnormal noise from occurring due to contact between the stay cloth coupling section and the side frame.

The above vehicle seat may be further configured such that the stay cloth coupling section is in contact with the inner side of the airbag module. In this configuration, the stay cloth coupling section is brought into contact with a side of the airbag module, which prevents the stay cloth coupling section from making a rocking motion. As a result, the stay cloth coupling section is less likely to contact the side frame, which prevents abnormal noise from occurring due to contact between the stay cloth coupling section and the side frame.

In the above-described configurations, one provides an airbag module support structure (423) for a vehicle seat, the airbag module support structure comprising: a bracket (450) including a bracket coupler portion (455) configured to be coupled to a side part of a frame (409), the frame forming a framework of the vehicle seat, on one side in a left-right direction of the vehicle seat so as to extend outward from the frame, and a bracket flat portion (456) having a plate shape and extending frontward from a lateral edge of the bracket coupler portion and defining hang holes extending through the bracket flat portion in the left-right direction; a wire member having hook sections (465) configured to be latched into or hung onto the hang holes, and extension sections (466) extending frontward from the hook sections along an outer surface of the bracket flat portion; and a retainer (452) including a retainer coupler portion (470) configured to be coupled to the side part of the frame or to the bracket coupler portion and extending over and along the outer side of the bracket flat portion, and a retainer flat portion (471) extending frontward from the retainer coupler portion and over the outer side of the bracket flat portion, the retainer flat portion (471) facing the outer side of the bracket flat portion with the wire member located therebetween; wherein the retainer coupler portion and the bracket coupler portion are shaped to have respective cutouts (460, 480) extending therethrough in a front-rear direction, the cutouts being located to be in alignment with the hang holes. In this configuration, the retainer coupler portion and the bracket coupler portion are shaped to have the respective cutouts extending therethrough in the front-rear direction such that the cutouts are located to be in alignment with the hang holes, which enables an assembling worker to easily make a visual check of whether the hook sections are latched into or hung onto the hang holes, from the rear of the retainer and the bracket. As a result, the worker is allowed to easily check whether the wire member is properly coupled to the side part of the frame during assembly.

In the above-described configurations that accomplish the above-described task, one provides a method for assembling a vehicle seat (401), wherein the vehicle seat comprises: a seat frame (409) including a pair of left and right side frames (417); a bracket (450) including a bracket coupler portion (455) configured to be coupled to a side frame on one side in a left-right direction of the vehicle seat so as to extend outward from the side frame, and a bracket flat portion (456) having a plate shape and extending frontward from a lateral edge of the bracket coupler portion and defining hang holes extending through the bracket flat portion in the left-right direction; a wire member having hook sections (465) configured to be latched into or hung onto the hang holes, and extension sections (466) extending frontward from the hook sections along an outer surface of the bracket flat portion; a retainer (452) including a retainer coupler portion (470) configured to be coupled to the one of the side frames or to the bracket coupler portion, and extending over and along the outer side of the bracket flat portion and a retainer flat portion (471) extending frontward from the retainer coupler portion and over the outer side of the bracket flat portion, the retainer flat portion (471) facing the outer side of the bracket flat portion with the wire member located therebetween; wherein the retainer coupler portion and the bracket coupler portion are shaped to have respective cutouts (460, 480) extending therethrough in a front-rear direction, the cutouts being located to be in alignment with the hang holes, the method comprising the steps, in order, of latching the hook sections of the wire member into the hang holes; and coupling the retainer coupler portion to the side frame or the bracket coupler portion. In this configuration, the retainer coupler portion and the bracket coupler portion are shaped to have the respective cutouts extending therethrough in the front-rear direction, the cutouts being located to be in alignment with the hang holes, which enables an assembling worker to, after assembly of the seat frame, easily make a visual check of whether the hook sections are latched into or hung onto the hang holes, from the rear of the retainer and the bracket. As a result, the worker is allowed to easily check whether the wire member has been properly coupled to the side frame during assembly.

DESCRIPTION OF THE PREFERRED
EMBODIMENT(S)

Embodiments of a vehicle seat according to the present invention, in which the vehicle seat is used in a rearmost row of rear seats of a vehicle, will be described with reference to the appended drawings. In the following description, the front/rear, left/right, and up/down directions are defined relative to a passenger vehicle equipped with the vehicle seat.

First Embodiment

Figure 1:
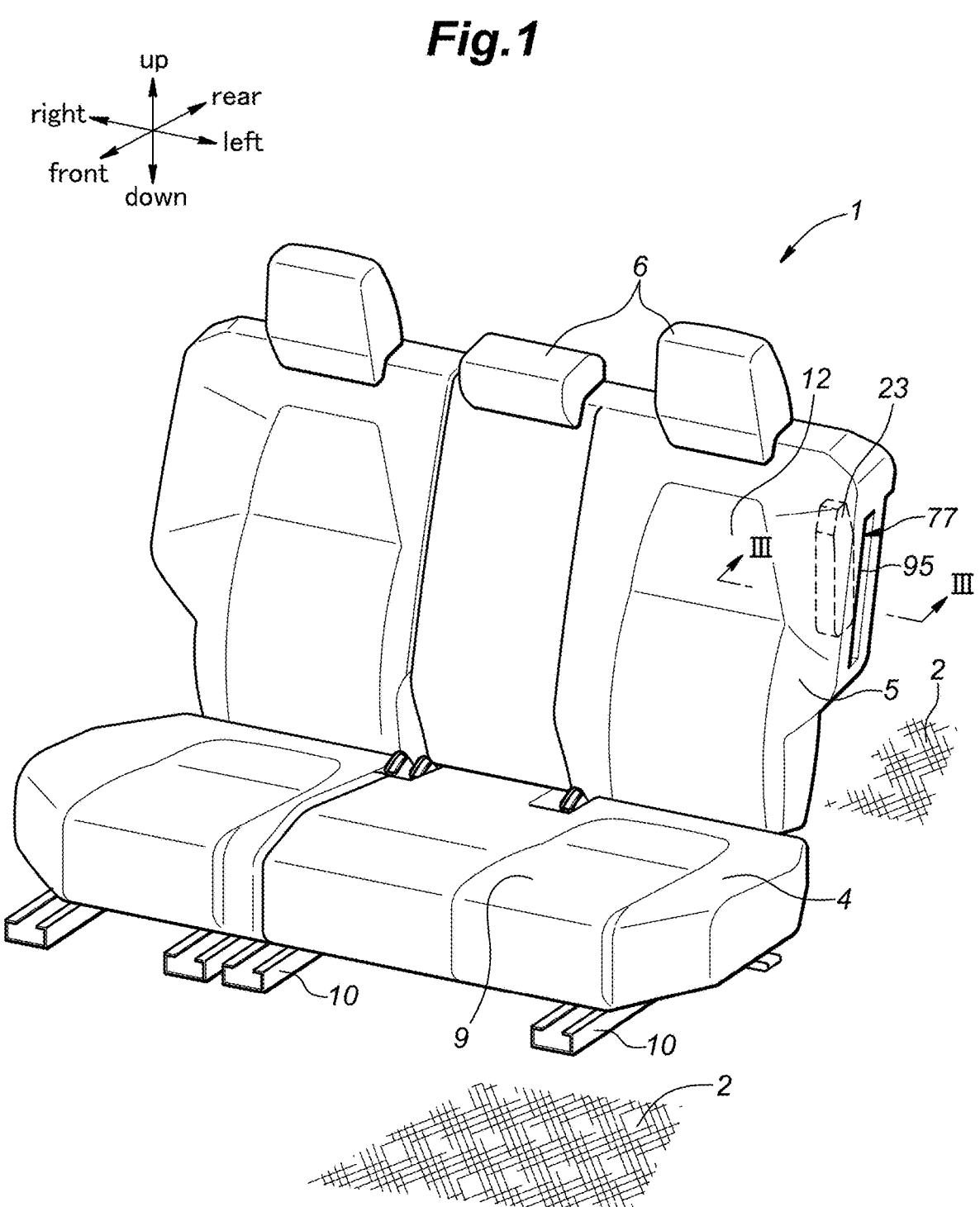
FIG. 1 is a perspective view of a seat equipped with a vehicle seat according to a first embodiment of a first aspect of the present invention.

As shown in FIG. 1, a vehicle seat 1 according to the present invention is provided in a vehicle having two rows of seats in a front-rear direction, and forms a left side seat in the second row of rear seats. The vehicle seat 1 is provided on a floor 2 of the vehicle. The vehicle seat 1 includes a seat cushion 4 adapted to support a seated occupant, a seatback 5 supported at the rear of the seat cushion 4 and serving as a back recline, and headrests 6 provided on the top of the seatback 5.

The seat cushion 4 extends in a left-right direction and forms a seating surface 9 for two occupants. Provided below the seat cushion 4 are left and right lower rails 10 that are coupled to an upper surface of the floor 2 and extend in the front-rear direction. Left and right upper rails are engaged with the left and right lower rails 10, respectively, so as to be slidably moved along the lower rails 10. The seat cushion 4 is supported by the floor 2 via the lower rails 10 and the upper rails, and is capable of sliding rear and front.

The seatback 5 extends vertically and has a generally box-like shape with a surface facing frontward. A support surface 12 is formed on the front surface of the seatback 5 to support the backs of two occupants. The lower end of the seatback 5 is rotatably coupled to the rear end of a frame by using a known reclining mechanism, where the frame is provided to support the seat cushion 4.

As shown, the two headrests 6 are provided at the top of the seatback 5, side by side, on the left and right. The respective lower ends of the headrests 6 may be rotatably coupled to the seatback 5 so as to be rotatable about an axis in the left-right direction. The vehicle seat 1 may be an under-floor-storable seat configured such that a user can operate a strap to fold the seatback 5 frontward, storing the seat in a storage space under the floor 2.

Figure 2:
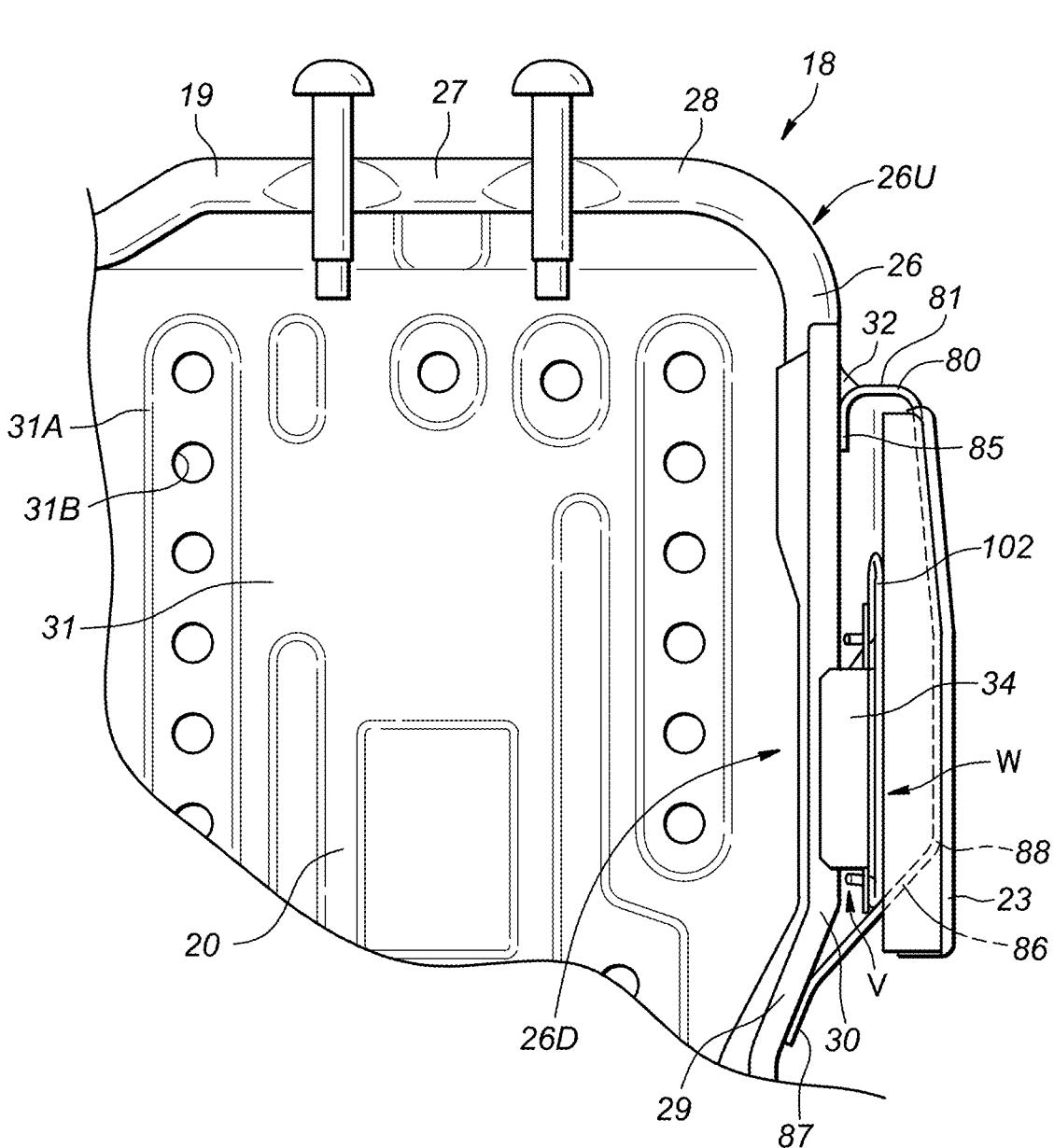
FIG. 2 is a front view of the vehicle seat when a pad member and a skin cover are removed.
Figure 3:
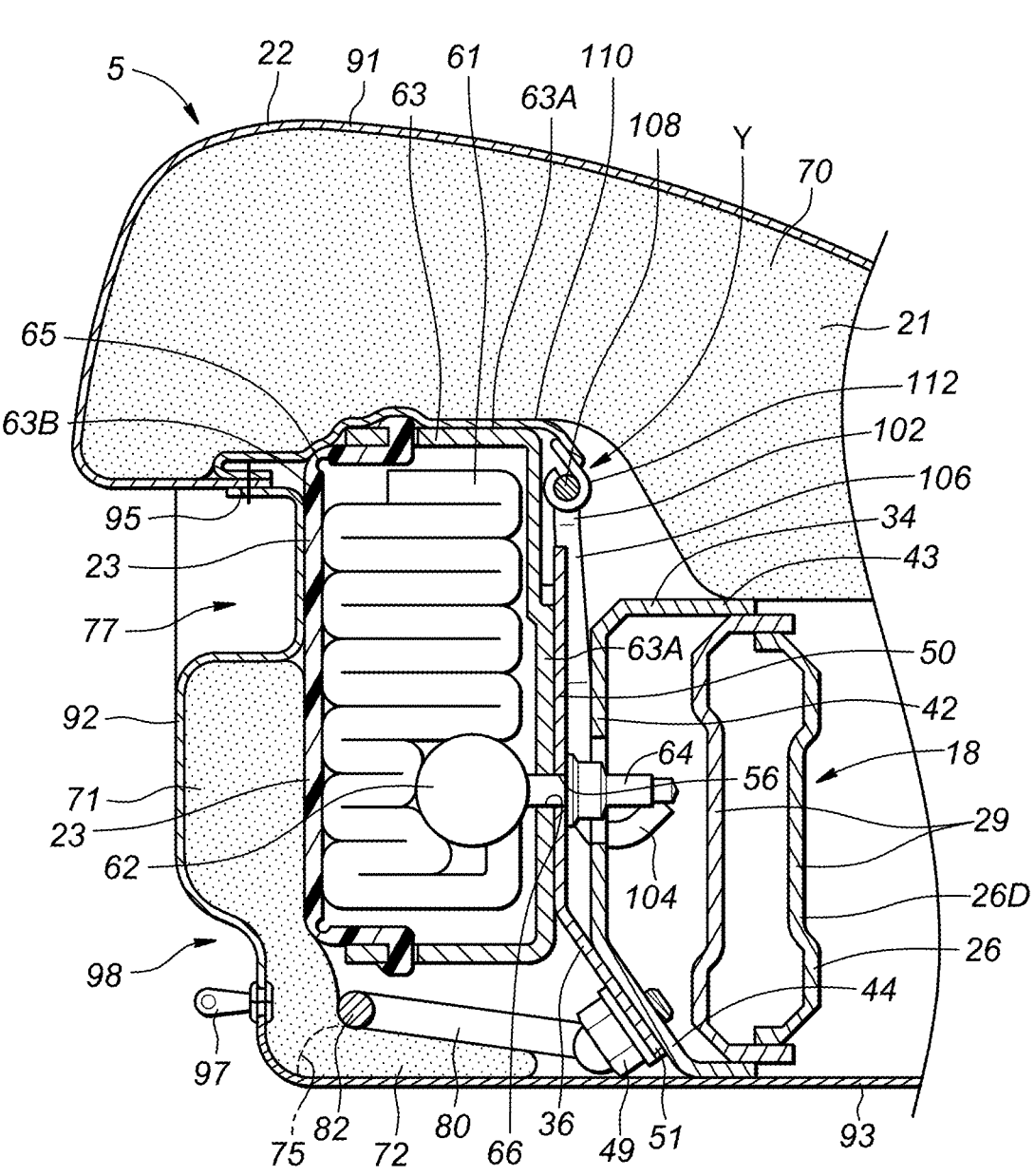
FIG. 3 is cross-sectional view taken along line III-III in FIG. 1.

Next, the structure of the seatback 5 will be described. As shown in FIGS. 2 and 3, the seatback 5 includes a seatback frame 18 (FIG. 2) configured to form a framework of the seat, a pad member 21 (FIG. 3) supported by the seatback frame 18, a skin cover 22 (FIG. 3) provided on the front surface of the pad member 21 to form an outer surface of the seatback 5, and an airbag module 23 (FIGS. 2 and 3) supported on the seatback frame 18.

As shown in FIG. 2, the seatback frame 18 forms the framework of the seatback 5, and includes a seatback frame outer portion 19 that forms a rectangular frame and a pan frame 20 (plate) located on the rear side of the seatback frame outer portion 19. The seatback frame outer portion 19 includes left and right side frames 26 (side members) extending vertically, an upper frame 27 extending in the left-right direction and coupled to the upper ends of the left and right side frames 26, and a lower frame (not shown) extending in the left-right direction and coupled to the lower portions of the left and right side frames 26. The side frame upper portions 26U and the upper frame 27 constitute the respective upper portions of the left and right side frames 26, and are formed by the bending of one circular pipe 28 into an inverted U-shaped. Side frame lower portions 26D are the lower portions of the left and right side frames 26, and are formed by sheet metal members 29 each having opposing left and right surfaces (i.e., surfaces facing away from each other in the left-right direction). The inner sides of the upper portions of the sheet metal members 29 are welded to the lower ends of the pipe 28. The front and rear edges of each of the sheet metal members 29 are bent toward the inside of the seat. The lower ends of the left and right side frames 26 each are rotatably coupled to the frame, by a reclining mechanism, for supporting the seat cushion 4. In the present embodiment, as shown in FIG. 3, the side frame lower portion 26D is formed by the two sheet metal members 29 that are arranged to face each other in the left-right direction and are coupled to each other.

Figure 4:
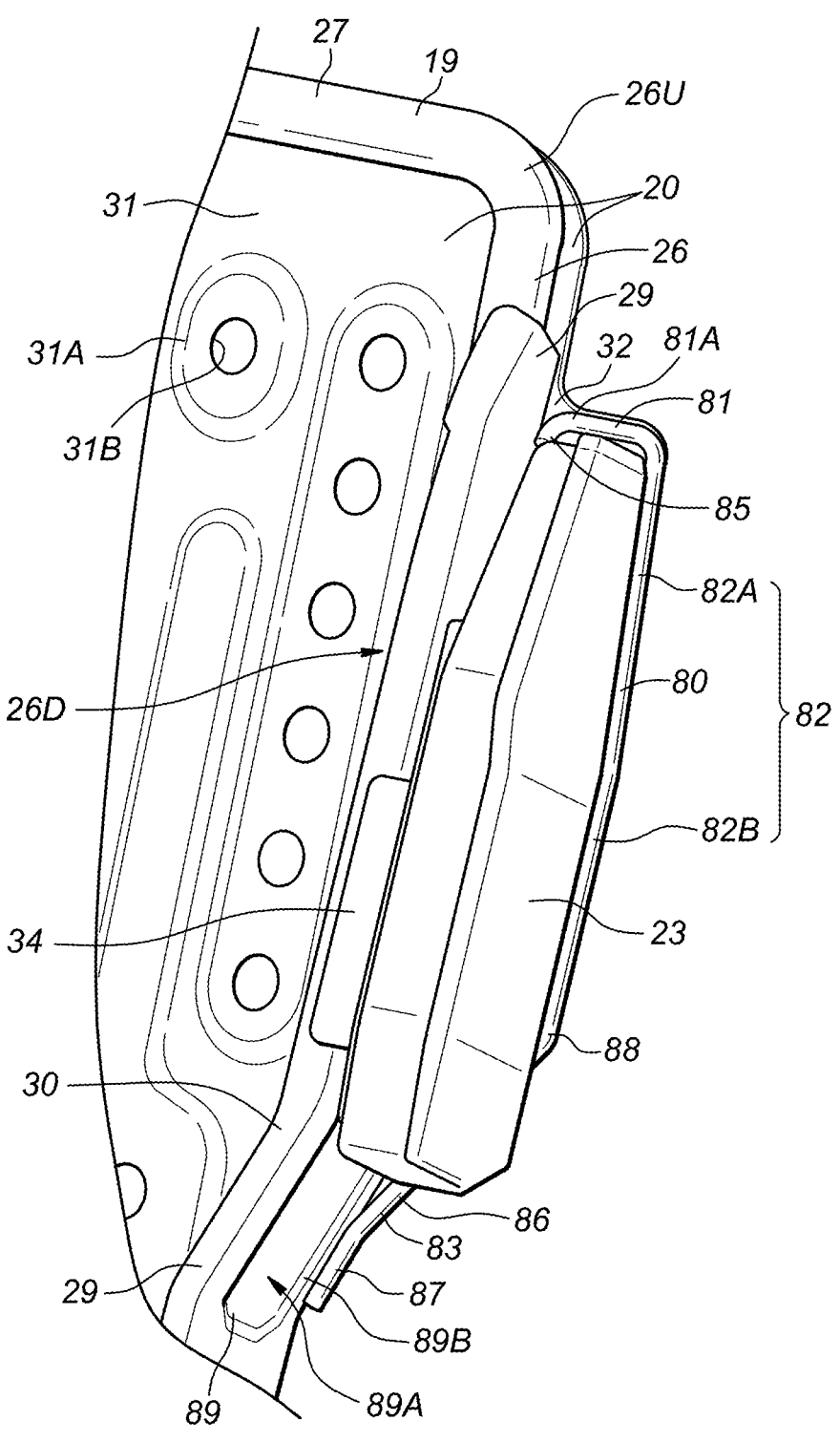
FIG. 4 is a perspective view of an upper left portion of the vehicle seat when the pad member and the skin cover are removed.

As shown in FIGS. 3 and 4, the left side frame lower portion 26D has a frame bend section 30 in the center part in the vertical direction, where the frame bend section 30 is bent inward in the left-right direction (i.e., bent to the right).

Figure 6:
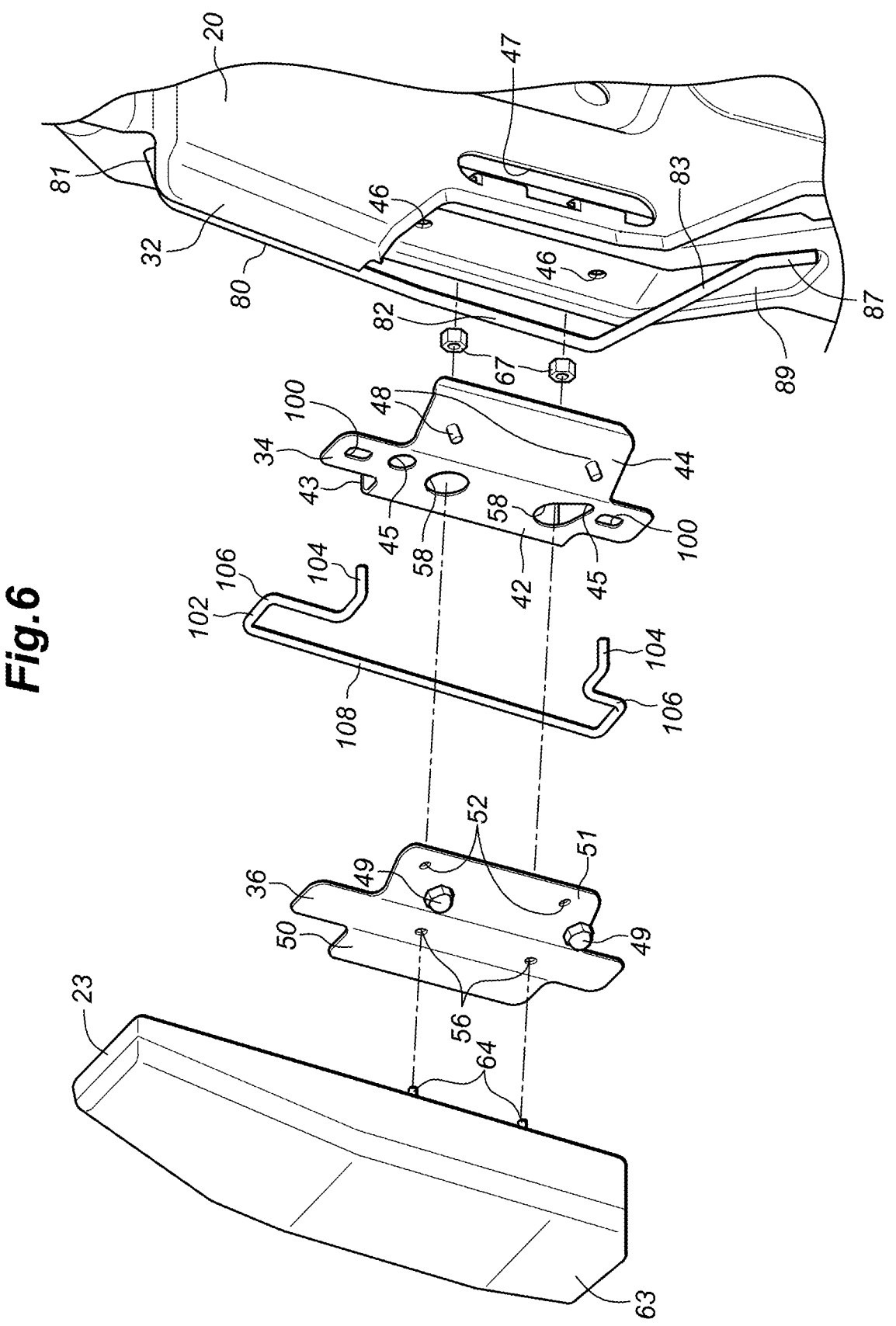
FIG. 6 is an exploded perspective view, as viewed from the rear, of the structure for coupling the airbag module to the side frame.

The pan frame 20 is a metal plate-shaped member and is positioned on the rear side of the side frames 26 and the upper frame 27 so that the pan frame has front and rear surfaces facing away from each other. As shown in FIG. 6, the pan frame 20 includes a pan frame base 31 extending to cover the respective rear sides of the side frames 26, the upper frame 27, and the lower frame, and a pan frame protrusion 32 extending outward from the pan frame base 31 beyond the outer (left) edge of the outer (left) side frame 26. The upper edge, the lower edge, and the left and right side edges of the pan frame 20 are welded to the upper frame 27, the lower frame, and proper locations on the left and right side frames 26, respectively. As shown in FIG. 4, a plurality of beads 31A and punch holes 31B for reinforcement may be provided at proper locations on the pan frame base 31.

As shown in FIG. 3, the left side frame 26 is directly coupled to a frame bracket 34. Fastened to the frame bracket 34 is a module bracket 36 (retainer) configured to hold the airbag module 23. The airbag module 23 is coupled to the side frame 26 via the module bracket 36 and the frame bracket 34. The airbag module 23 has a generally box-like shape extending along the side frame 26 and is positioned so that the outer surface of the airbag module 23 faces to the left (outside).

Figure 5:
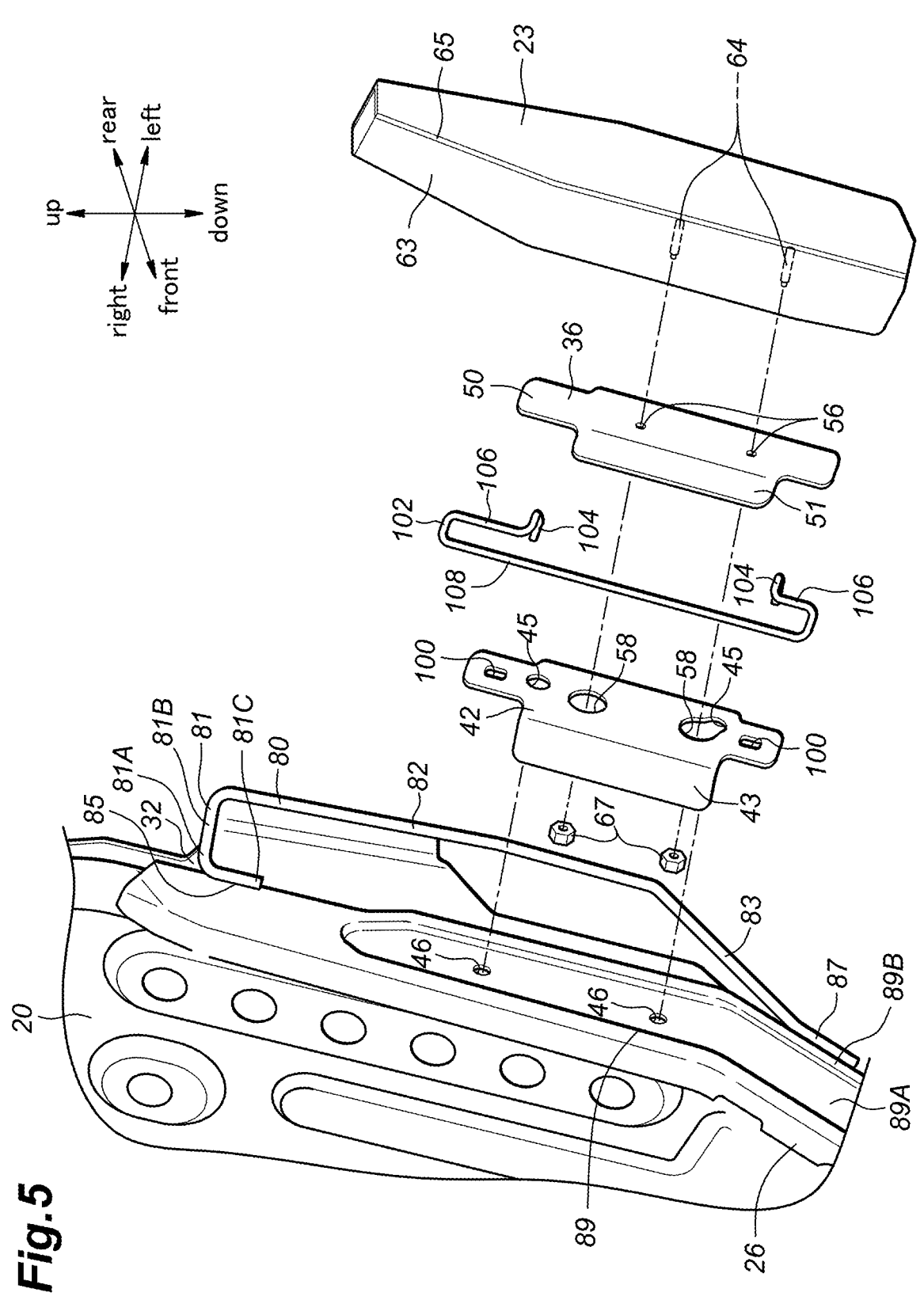
FIG. 5 is an exploded perspective view, as viewed from the front, of a structure for coupling an airbag module to a side frame.

As shown in FIGS. 5 and 6, the frame bracket 34 is a folded sheet metal member, and includes a generally square plate-shaped bracket base 42 having opposing surfaces generally facing away from each other in the left-right direction, a bracket front section 43 (FIG. 5) extending from the front edge of the bracket base 42, and a bracket slope section 44 (FIG. 6) extending from the rear edge of the bracket base 42.

As shown in FIG. 5, the bracket front section 43 is a plate part extending rightward from the front edge of the bracket base 42. As shown in FIG. 7(A), the bracket front section 43 is welded to the front face of the sheet metal member 29 that forms the left side frame lower portion 26D. In the present embodiment, the upper and lower right edges of the bracket front section 43 are welded to the front surface of the sheet metal member 29. In FIGS. 7(A) and 7(B), the welded portions are indicated with dot-hatching.

As shown in FIGS. 3 and 6, the bracket slope section 44 is a plate section inclined rearward to the right (inner side). As shown in FIG. 7(B), the rear edge of the bracket slope section 44 is bent to the right and welded to the rear surface of the sheet metal member 29. In the present embodiment, the upper and lower right edges of the bracket slope section 44 are welded to the rear surface of the sheet metal member 29. As a result, the frame bracket 34 is coupled to a seatback frame outer portion 19 on one side (i.e., one of the left or right sides; the left side in the present embodiment) of the vehicle seat.

As shown in FIGS. 5 and 6, the frame bracket 34 and the sheet metal member 29 are preferably provided with positioning holes 45 and 46, respectively. In the present embodiment, the bracket base 42 is provided with two through holes, i.e., the positioning holes 45, and the sheet metal member 29 is also provided with two through holes, i.e., the positioning holes 46 at corresponding locations to the positioning holes 45. During welding, the frame bracket 34 is easily maintained at the proper position relative to the sheet metal member 29 by inserting jigs into the positioning holes 45 in the bracket base 42 and the corresponding positioning holes 46 in the sheet metal member 29. This facilitates the welding of the frame bracket 34 to the sheet metal member 29 at the proper relative position to the sheet metal member 29. In addition, as shown in FIG. 6, in order to facilitate the welding of the frame bracket 34 to the sheet metal member 29, the pan frame 20 is provided with welding work holes 47, i.e., through holes used for welding work, extending in the front-rear direction at locations rearward of the frame bracket 34.

As shown in FIG. 6, the bracket slope section 44 is provided with two stud bolts 48. More precisely, the stud bolts 48 are inserted into and welded to the through holes in the bracket slope section 44 so as to be secured to the bracket slope section 44.

As shown in FIGS. 5 and 6, the module bracket 36 is a folded sheet metal member, and includes a plate-shaped retainer base 50 extending in the front-rear direction, and a plate-shaped retainer slope section 51 extending from the rear edge of the retainer base 50 and inclined rearward to the right.

As shown in FIG. 6, the retainer slope section 51 has bolt holes 52 extending through it in the thickness direction. The retainer slope section 51 is provided to extend along the rear surface of the bracket slope section 44. The stud bolts 48 are passed through the bolt holes 52, and the module bracket 36 is fastened to the frame bracket 34 by the tightening of nuts 49 (fasteners) to the stud bolts 48. In the present embodiment, domed nuts (cap nuts) are used as the nuts 49. In the following description, a point where the frame bracket 34 is fastened to the module bracket 36, i.e., the position of the center of the bolt holes 52, is sometimes referred to as a "fastening point P" as necessary.

Figure 7:
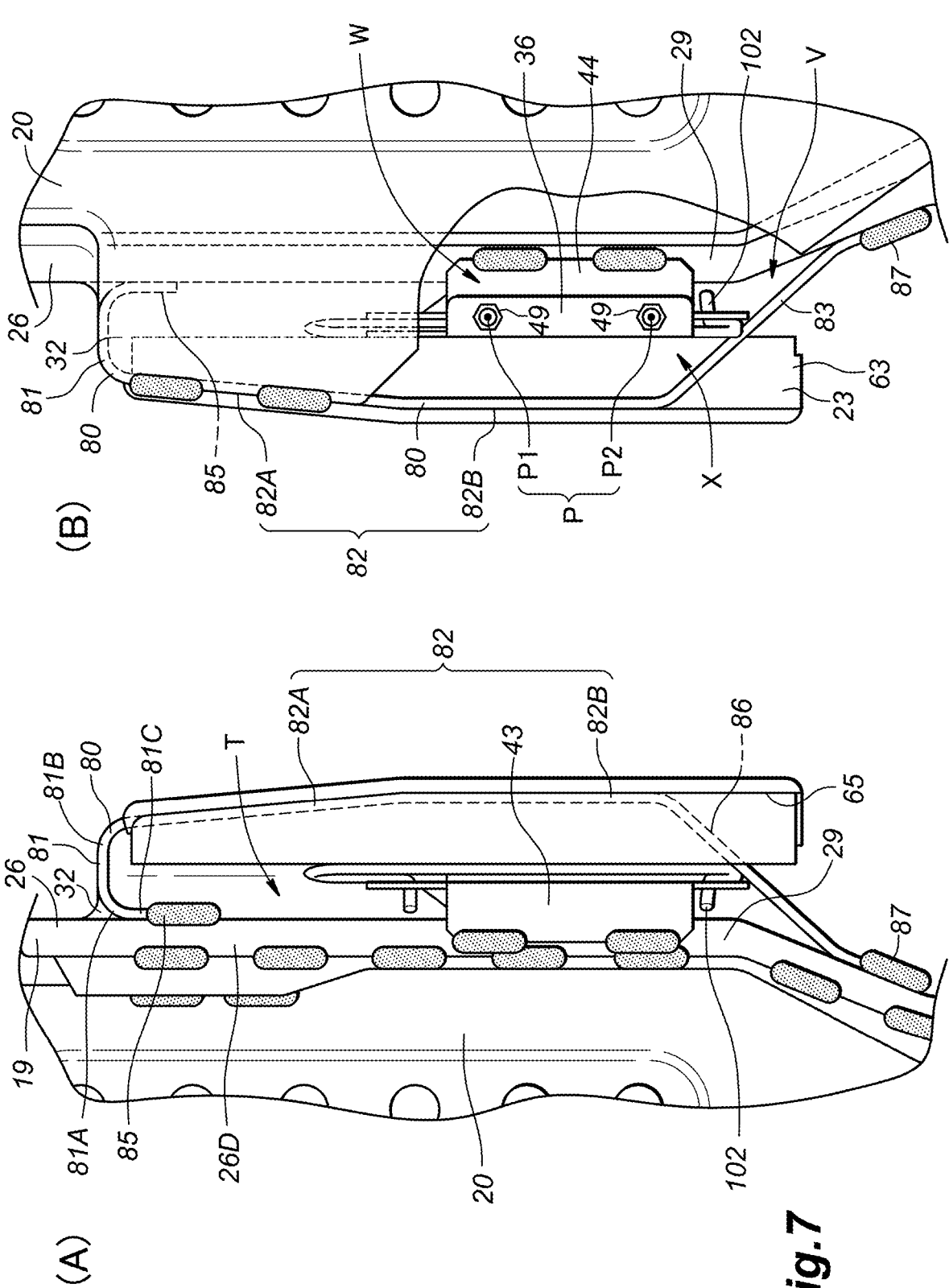
FIG. 7 is a diagram showing an upper left portion of the vehicle seat when the pad member and the skin cover are removed, and (A) and (B) are front and rear views of the upper left portion, respectively.

The module bracket 36 is provided with the bolt holes 52 at the positions corresponding to those of the stud bolts 48 of the bracket slope section 44. As a result, the frame bracket 34 is fastened to the module bracket 36 at two fastening points P1 and P2 (FIG. 7).

In the present embodiment, as shown in FIGS. 5 and 6, the module bracket 36 has the same vertical size as the frame bracket 34. More particularly, the vertical size of the bracket base 42 is substantially the same as that of the retainer base 50, and when the frame bracket 34 is fastened to the module bracket 36, the bracket base 42 and the retainer base 50 are arranged such that the top and lower edges of the bracket base 42 are aligned with those of the retainer base 50 in the vertical direction, respectively.

As shown in FIG. 3, the airbag module 23 includes an airbag 61, an inflator 62 configured to release gas into the airbag 61 to inflate and deploy the airbag 61, and a generally box-like shaped housing 63 that houses the airbag 61 and inflator 62. The inflator 62 is provided with male threaded protrusions 64 each having a generally cylindrical shape and protruding radially outward from the circumference of the inflator.

The housing 63 has a generally box-like shape. The housing 63 includes a housing body 63A opening outward from the outer side, and a lid 63B configured to close the opening of the housing body 63A. The airbag 61 and the inflator 62 are housed in the housing body 63A. As shown in FIG. 6, the airbag 61 is housed inside the housing 63 in a folded state. The left front edge of the lid 63B has a tear-off line 65 that is designed to tear open under the force of the bag inflation and deployment of the airbag 61. The bottom wall of the housing body 63A is provided with through holes 66 extending therethrough in the thickness direction at predetermined positions.

The male threaded protrusions 64 protrude from the interior of housing 63 to the exterior through the through holes 66. As shown in FIG. 5, the retainer base 50 has bolt holes 56 extending through it in the thickness direction such that the male threaded protrusions 64 are to be inserted into the bolt holes 56. The housing 63 is fastened to the retainer base 50 by the tightening of nuts 67 onto the male threaded protrusions 64. As a result, the airbag module 23 is coupled to the module bracket 36 and held on the left side of the retainer base 50. In the present embodiment, two through holes 58 are provided in the bracket base 42 such that interference between the male threaded protrusions 64 and the frame bracket 34 is avoided when the module bracket 36 is fastened to the frame bracket 34. As shown in FIGS. 5 and 6, the through holes 58 and the positioning holes 45 may be connected and formed to be one hole.

Figure 8:
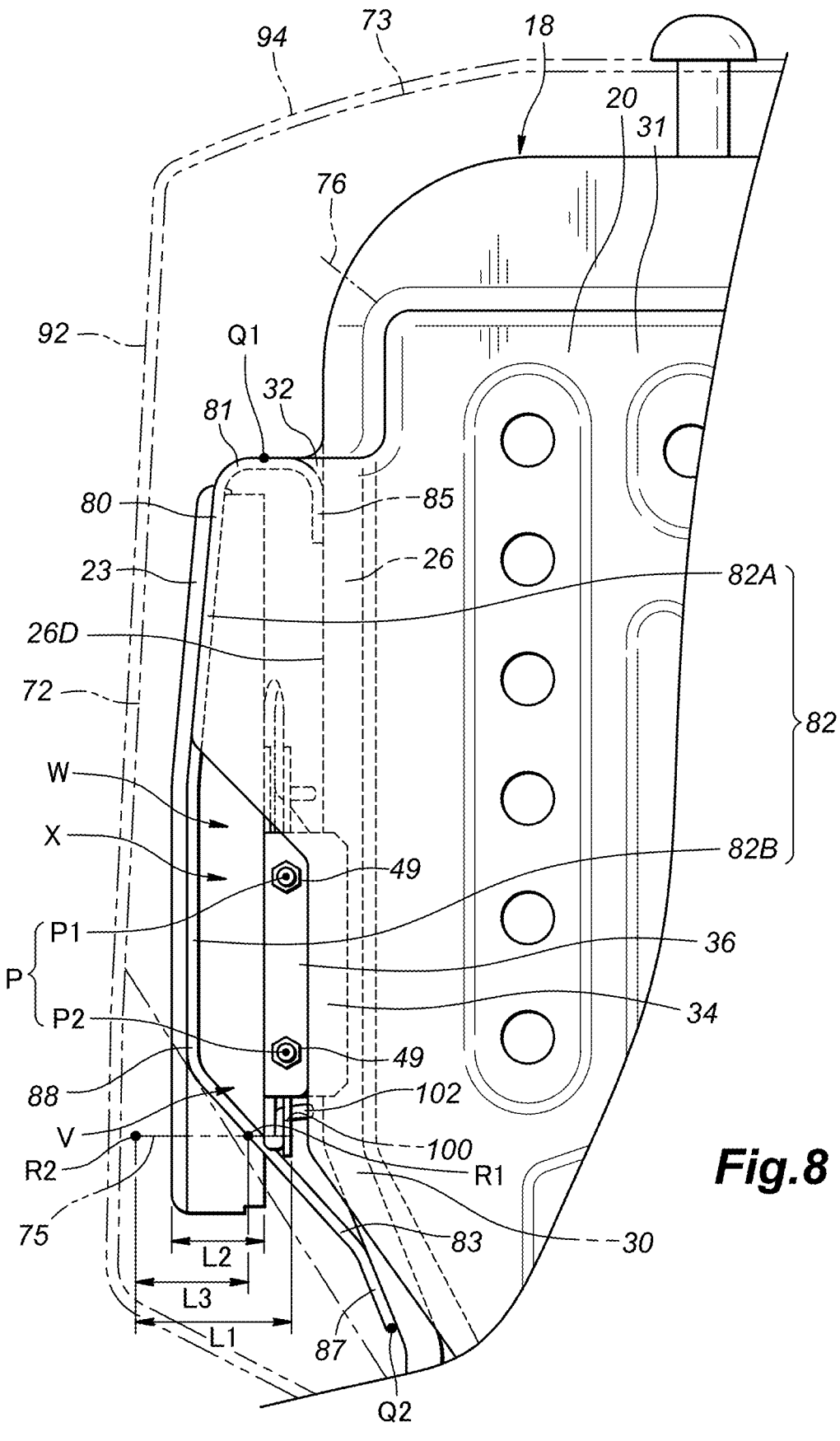
FIG. 8 is a rear view of the vehicle seat when the pad member and the skin cover are removed.
Figure 9:
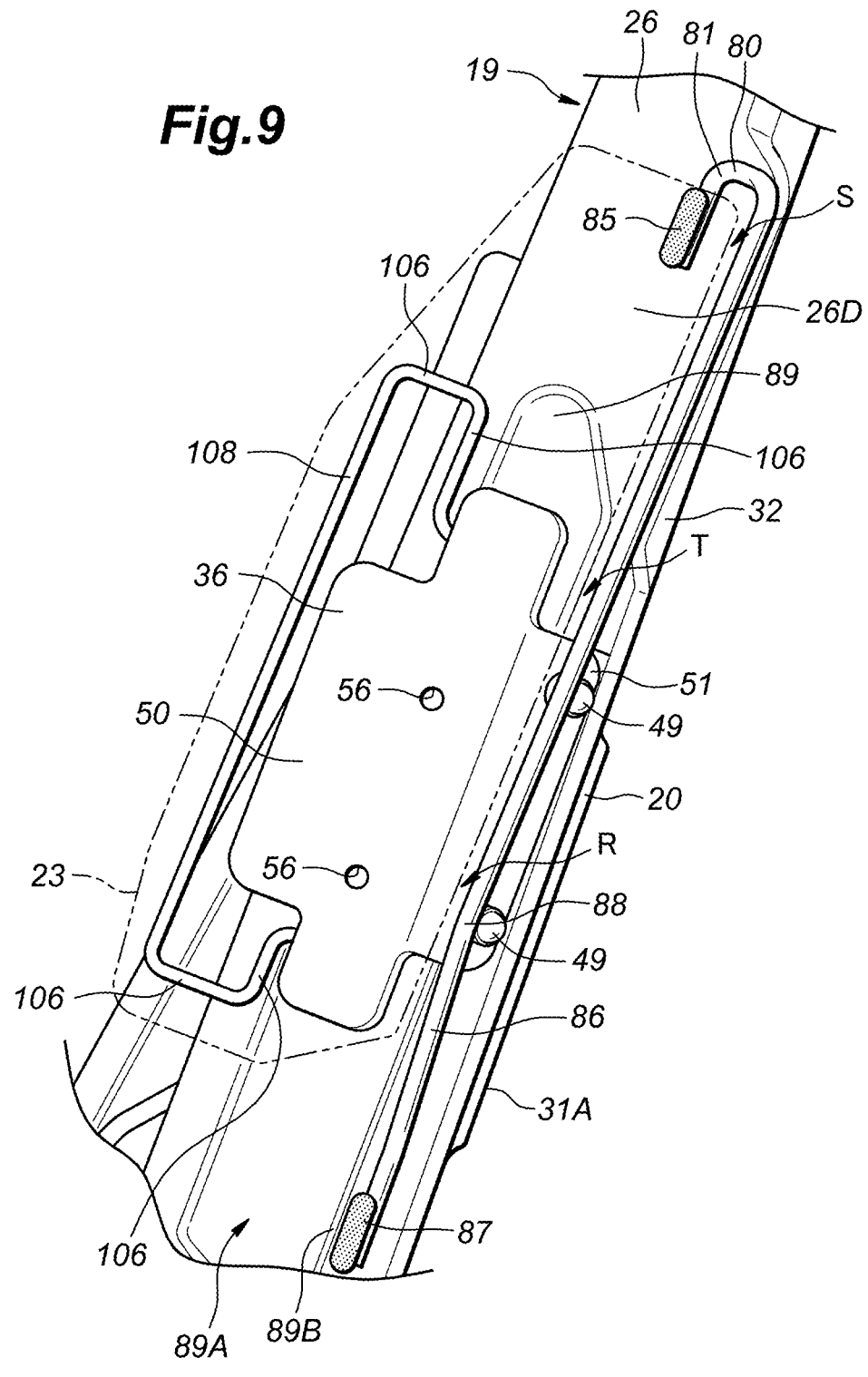
FIG. 9 is a side view of the upper left portion of the vehicle seat when the pad member, the skin cover, and the airbag module are removed.

As shown in FIGS. 2 and 8, the pan frame protrusion 32 extends to the left beyond the left side frame 26 and reaches a location rearward of the left edge of the airbag module 23, as viewed in the rear view. As shown in FIG. 9, the pan frame protrusion 32 is spaced apart from the rear surface of the airbag module 23, so that a gap space S is formed between the pan frame 20 and the airbag module 23 in the front-rear direction.

As shown in FIG. 8, the pan frame protrusion 32 extends over (i.e., overlaps) the upper half of the airbag module 23 in the rear view, so that the airbag module 23 is covered by the pan frame protrusion 32 from the rear side. The upper edge of the pan frame protrusion 32 is aligned vertically with that of the airbag module 23, while the lower edge of the pan frame protrusion 32 is positioned between the upper and lower edges of the airbag module 23 in the vertical direction. In the present embodiment, the lower edge of the pan frame protrusion 32 is positioned substantially in the center of the airbag module 23 in the vertical direction.

Figure 10:
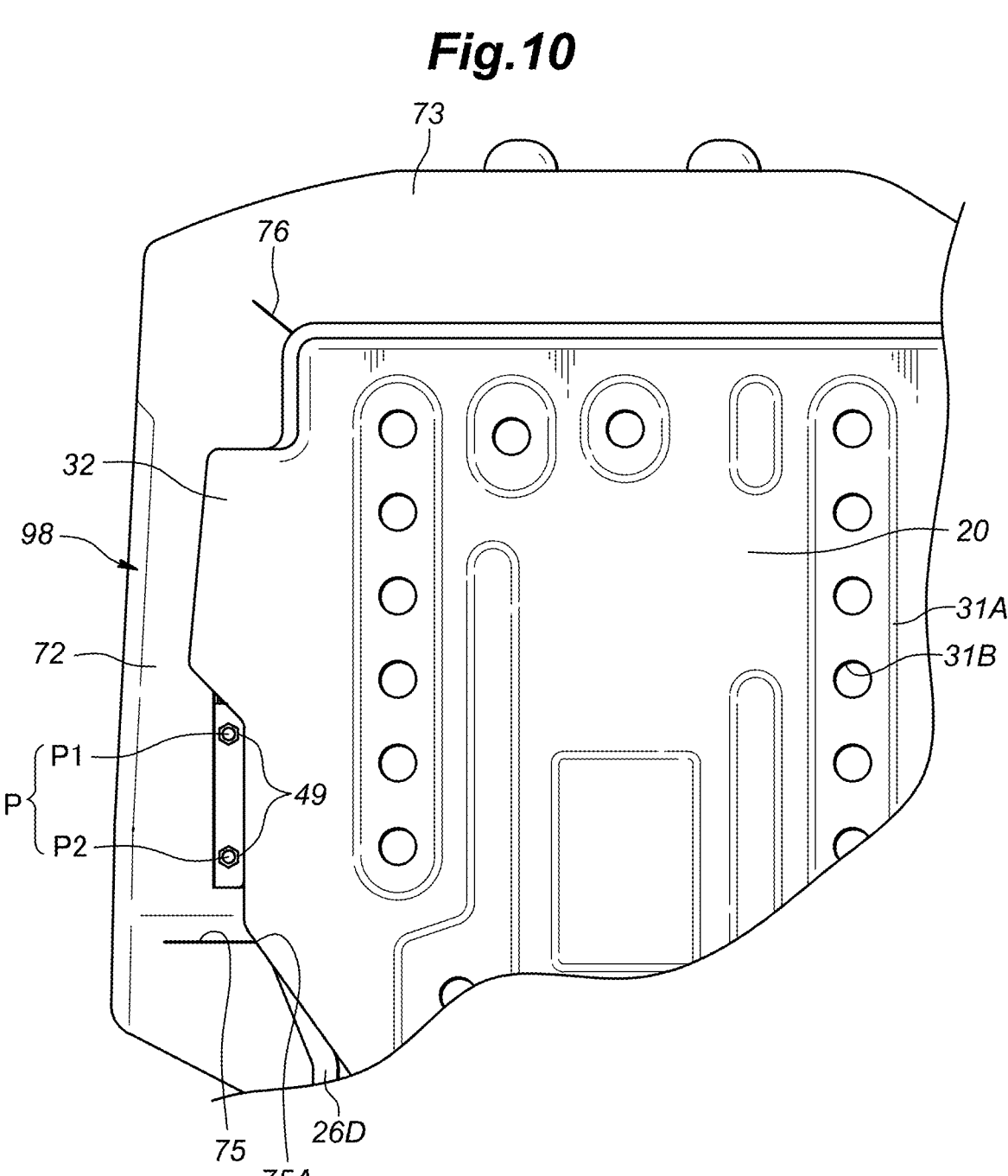
FIG. 10 is a rear view of the vehicle seat when the skin cover is removed.

The pad member 21 is formed of a flexible cushioning material such as polyurethane foam. As shown in FIGS. 3 and 10, the pad member 21 includes: a front pad member 70 (FIG. 3) configured to cover the seatback frame outer portion 19 and the airbag module 23 from the front; a side pad member 71 (FIG. 3) configured to be coupled to an outer (i.e., left side) portion of the front pad member 70 and extend rearward; a rear pad member 72 (FIGS. 3 and 10) extending from the rear end of the side pad member 71 toward the inner side (i.e., right side) in the left-right direction; and an upper pad member 73 (FIG. 10) configured to connect the upper ends of the front pad member 70, the rear pad member 72, and the side pad member 71 to each other. The rear pad member 72 covers the seatback frame outer portion 19 and the airbag module 23 from the rear, while the upper pad member 73 covers the seatback frame outer portion 19 and the airbag module 23 from the above.

As shown in FIG. 10, the rear pad member 72 has a slit 75 extending outward (to the left side) from the inner edge (right edge) of the rear pad member in left-right direction. The slit 75 is a cut extending through the rear pad member 72 in the front-rear direction and located below the frame bracket 34. As shown in FIG. 8, the slit 75 has a straight line shape and extends horizontally (i.e., in the left-right direction) and reaches a location rearward of the airbag module 23. In the present embodiment, the slit 75 extends from the right edge of the rear pad member 72 to the left along the lower edge of the airbag module 23 in the rear view and reaches a location rearward of the lower left edge of the airbag module 23. As shown in FIG. 8, the slit 75 is formed to have a lateral width L1 that is greater larger than the left-to-right width L2 of the airbag module 23. From the inside of the rear pad member 72, the slit 75 extends rightward direction from a location at a generally center portion in the left-right direction of the rear pad member 72 and reaches the inner right end of the rear pad member 72 to form an opening end 75A. In other words, the right edge of the slit 75 defines the opening end 75A, which opens toward the right direction.

As shown in FIG. 10, an auxiliary slit 76 is formed to extend through the rear or upper pad member in the front-rear direction at a location where the rear pad member 72 is connected to the upper pad member 73 in the right-left direction. The auxiliary slit 76 is also a cut extending through the pad member in the front-rear direction. In the present embodiment, the auxiliary slit 76 extends from the upper inner edge (right edge) of the rear pad member 72 toward the outer edges (i.e., toward the left). In the present embodiment, the auxiliary slit 76 has a straight line shape and extends upward to the right from the upper right edge of the rear pad member 72. The auxiliary slit 76 is preferably formed to extend in the direction at an angle of approximately 45 degrees.

As shown in FIG. 10, the slit 75 is located below the two fastening points P1 and P2, as viewed in the rear view, and the auxiliary slit 76 is located above the two fastening points P1 and P2. In other words, the two fastening points P1 and P2 are located between the slit 75 and the auxiliary slit 76 in the rear view.

The side pad member 71 has a box-like shape extending vertically over an outer (i.e., left side) edge of the airbag module 23 to cover the airbag module 23 from the outer side. As shown in FIG. 3, a deployment hole 77 is provided in a front portion of the side pad member 71. The deployment hole 77 passes through the front portion of the side pad member 71 in the left-right direction, and is located on the outer side (i.e., left side) of the airbag module 23. In the present embodiment, as shown in FIG. 1, the deployment hole 77 is formed to extend vertically along the seatback 5, and as shown in FIG. 3, the deployment hole 77 is located frontward of the slit 75.

As shown in FIG. 4, the vehicle seat 1 includes a shape former 80 coupled to the seatback frame outer portion 19, more particularly to the left side frame 26 in this case. The shape former 80 is formed by a folded wire member and is welded to the left side frame 26 at the both ends, as shown in FIG. 7(A). As shown in FIG. 9, the shape former 80 is located rearward of the airbag module 23 so that a gap space T is formed between the airbag module 23 and the shape former 80 in the front-rear direction. Thus, as the shape former 80 is formed of a wire member, the shape former 80 is enabled to be made lightweight and has a simple structure of the shape former 80.

As shown in FIG. 4, the shape former 80 is welded to the upper portion of left side frame 26. The shape former 80 includes: a shape former upper portion 81 (upper portion of the shape former) extending outward to the left from the left side frame 26; a shape former center portion 82 extending downward from the left end of the shape former upper portion 81; and a shape former lower portion 83 extending downward to the right from the lower end of the shape former center portion 82 and welded to the lower portion of the left side frame 26.

As shown in FIG. 5, the shape former 80 has a curved section 81A formed so as to bend and extend downward along the upper portion of the left side frame 26 at the inner end of the shape former upper portion 81 (in the present embodiment, at the right end). Specifically, the shape former upper portion 81 has a body section 81B extending in the left-right direction and an extension section 81C extending downward from the inner end (right end) of the body section 81B. As shown in FIG. 7(A), an upper attachment section 85 is provided in the curved section 81A, more accurately, in the extension section 81C, and the shape former upper portion 81 is welded along the upper attachment section 85 to the upper left side surface of the side frame 26. The upper attachment section 85 is located frontward of the upper edge of the pan frame protrusion 32, enabling the pan frame protrusion 32 to cover the upper attachment section 85 from the rear to thereby protect the upper attachment section 85 from loads applied from the rear. A middle section to the outer end of the shape former upper portion 81 is aligned in the front-rear direction with the upper edge of the pan frame protrusion 32; that is, the middle section of the shape former upper portion 81 extends in the left-right direction along the upper edge of the pan frame protrusion 32 in the rear view.

As shown in FIG. 4, the shape former center portion 82 includes an upper half portion 82A extending downward from the left end of the shape former upper portion 81 and extending along the outer side edge (i.e., left edge) of the pan frame protrusion 32, and a lower half portion 82B extending downward from the lower end of the upper half portion 82A. The upper half portion 82A extends from the vertical position of the upper edge to the lower edge of the pan frame protrusion 32, and the lower end of the upper half portion 82A, i.e., the upper end of the lower half portion 82B, is aligned in the front-rear direction with the lower and outer edge of the pan frame protrusion 32. The upper half portion 82A and the lower half portion 82B are located on the outer side (i.e., left side) of the left side frame 26. As shown in FIG. 8, a gap space W is formed in the left-right direction between the lower half portion 82B and the outer (left side) of the left side frame 26.

In the present embodiment, the upper half portion 82A of the shape former center portion 82 is coupled to the left edge of the pan frame protrusion 32. More specifically, as shown in FIG. 7(B), the upper half portion 82A is welded and coupled to the left edge of the pan frame protrusion 32 at two points.

As shown in FIG. 7(A), the shape former lower portion 83 includes a body section 86 extending generally straight down to the right from the lower end of the shape former center portion 82, and a lower attachment section 87 extending from the lower end of the body section 86 and welded to the left side surface of the left side frame 26. The body section 86 is inclined down to the right (inward in the left-right direction). The shape former 80 has a shape former curved section 88 formed so as to bend and extend downward and inward at the connection between the lower half portion 82B of the shape former center portion 82 and the body section 86. The lower attachment section 87 is provided at the lower end of the shape former 80, the lower attachment section being bent slightly downward along the left side frame 26. As shown in FIGS. 2, 7(B) and 8, the shape former curved section 88 is located above the frame bend section 30 and the lower attachment section 87 is located below the frame bend section 30. The upper part of the body section 86 is located on the left side with respect to the left side frame 26, and a gap space V is formed in the left-right direction between the upper part of the body section 86 and the left side frame 26.

In this way, as shown in FIGS. 7(B) and 8, the lower half portion 82B of the shape former center portion 82 and the shape former lower portion 83 connect the lower edge of the pan frame protrusion 32 and the lower portion of the left side frame 26. That is, the shape former 80 includes a portion extending between the lower edge of pan frame protrusion 32 and the lower portion of left side frame 26. In addition, a through-hole space X, which is formed to extend in the front-rear direction, is defined by the right edge of the lower half portion 82B of the shape former center portion 82, the right edge of the shape former lower portion 83, the lower edge of the pan frame protrusion 32, and the lower left edge of the left side frame 26.

In the present embodiment, as shown in FIG. 8, at least a part of the shape former center portion 82 (in this case, the entire area of the shape former center portion 82, including the upper half portion 82A and the lower half portion 82B) extends along the outer surface (i.e., left side) of the airbag module 23 in the rear view.

The pan frame protrusion 32 covers the upper part (the upper half in the present embodiment) of the airbag module 23 from the rear. Thus, when the pad member 21 and the skin cover 22 are not provided, the lower part (the lower half) of the airbag module 23 is visible from the rear through the through-hole space X, as shown in FIGS. 7(B) and 8. As shown in FIG. 8, the lower edge of the pan frame protrusion 32 is positioned above the two fastening points P1 and P2. At least when the pad member 21 and the skin cover 22 are not provided, both the two fastening points P1 and P2 are visible through the through-hole space X, and are accessible by a fastening tool (e.g., universal wrench) through the through-hole space X from the rear.

When the pad member 21 and the skin cover 22 are not provided, the upper or lower edge of the module bracket 36 is visible from the rear through the gap spaces V, W between the left side frame 26 and the shape former 80. In the present embodiment, the upper and lower edges of the module bracket 36 are visible from the rear through the through-hole space X.

As shown in FIG. 5, the left side frame 26 has a linear bead 89 extending vertically to increase the stiffness of the left side frame 26. The lower attachment section 87 is attached to the left side frame 26 rearward of the bead 89. In the present embodiment, the bead 89 is formed as a side frame recess 89A that is recessed inward from the outer side, and the lower attachment section 87 is welded near an edge 89B of the side frame recess 89A. As a result, the coupling between the shape former 80 and the side frame 26 is located near the edge 89B of the bead 89, which is a stiffened portion, and the shape former 80 is firmly supported by the side frame 26.

In the present embodiment, the shape former 80 is generally flush with the pan frame 20, as shown in FIG. 9. In other words, the shape former 80 and the pan frame 20 are generally provided on the same plane. The lower end of the shape former 80, more specifically, the rear end of the lower attachment section 87, is located close to the pan frame 20 in the side view.

The front and rear edges of the side pad member 71 are connected to the front pad member 70 and the rear pad member 72, respectively. As shown in FIG. 3, when the pad member 21 is assembled, the front pad member 70 and the rear pad member 72 are located frontward and rearward of the shape former 80, respectively. The side pad member 71 is pulled inward (i.e., to the right) by the front pad member 70 and the rear pad member 72, and in contact with the left side of the shape former 80. The shape former 80 is in contact with the inner side surface of the side pad member 71, i.e., the right side surface to restrict the movement of the side pad member 71 to the right. This configuration determines the position of the side pad member 71, and forms the outer shape of the seatback 5. When a rightward load is applied to the left side surface of the seatback 5, the shape former 80 supports the side pad member 71 from the inner side thereof, thereby preventing deformation of the seatback 5. In other words, the shape former 80 defines the outer shape of the seatback 5 and serves to form the shape of the seatback 5.

As shown in FIG. 9, the shape former 80 is located rearward of the airbag module 23, and a gap space R is formed between the shape former 80 and the airbag module 23 in the front-rear direction.

When the pad member 21 is assembled to the seatback frame outer portion 19, the slit 75 is located below the upper edge of the shape former 80 and above the lower edge of the shape former 80. In this state, the slit 75 and the shape former 80 overlap in the front-rear direction. In the present embodiment, the slit 75 overlaps the shape former lower portion 83 in the front-rear direction. Furthermore, in the present embodiment, a slit-overlapping part of the shape former lower portion 83 overlaps the slit 75 in the front-rear direction, and the lateral distance L3 between the left end R1 (the outer side end) of the slit-overlapping part and the left end R2 (the outer side end) of the slit 75 is greater than the lateral width L2 of the airbag module 23.

The skin cover 22 is formed by the connection of a plurality of sheet-shaped members such as cloth and leather. As shown in FIG. 3, the skin cover 22 includes: a front skin cover 91 for covering the front surface of the front pad member 70 and the front left side of the side pad member 71; a left side skin cover 92 (outer skin cover) for covering the rear left side of the side pad member 71; a rear skin cover 93 for covering the rear surface of the rear pad member 72 and the rear surface of the pan frame 20; and an upper skin cover 94 (FIG. 8) for covering the upper surface of the upper pad member 73. The front, left, and rear edges of the upper skin cover 94 are sewn to the upper edges of the front skin cover 91, the left skin cover 92, and the rear skin cover 93, respectively.

As shown in FIG. 3, the left edge of the front skin cover 91 and the front edge of the left side skin cover 92 are stitched to each other to form a stitching line 95. The stitching line 95 serves as a breakable line in the skin cover 22 that can break under a smaller load than other stitches (e.g., the stitching line between the front edge of upper skin cover 94 and the top edge of front skin cover 91). The stitching line 95 extends vertically and is accommodated within the deployment hole 77 in the front of the side pad member 71.

The rear edge of the left side skin cover 92 and the left edge of the rear skin cover 93 are joined to each other by a slide fastener 97 that extends vertically. More specifically, the side pad member 71 is recessed inward (i.e., to the right) at the left side rear edge and the rear pad member 72 is recessed frontward at the rear side left edge. As shown in FIG. 3, the pad member 21 has a fastener receiving recess 98 recessed inward in the pad member 21 at the connection between the side pad member 71 and the rear pad member 72. The fastener receiving recess 98 extends vertically at the connection portion between the side pad member 71 and the rear pad member 72 at a position corresponding to the slide fastener 97. The slide fastener 97 is accommodated in the fastener receiving recess 98.

As shown in FIG. 10, the fastener receiving recess 98 is located to the left of opening end 75A. In other words, the fastener receiving recess 98 does not reach the right edge of the rear pad member 72, and the fastener receiving recess 98 and the opening end 75A are provided at different positions. This configuration can increase the stiffness of a portion of the rear pad member 72 near the opening end 75A of the slit 75, compared to the case where the fastener receiving recess 98 overlaps the opening end 75A, which can prevent breakage of the pad member 21.

As shown in FIG. 5, the bracket base 42 has hang holes 100 at the top and bottom thereof, the hang holes 100 extending through it in the thickness direction, i.e., in the left-right direction. A cloth-hook wire 102 is latched into the hang holes 100. The cloth-hook wire 102 is formed by the bending of a round metal bar into a predetermined shape. As shown in FIG. 5, the cloth-hook wire 102 includes a pair of upper and lower hooks 104 configured to be latched into or hung onto a corresponding hang hole 100 and located at both ends thereof, a pair of upper and lower coupling sections 106 extending frontward from the lower hooks 104 beyond the front end of the airbag module 23, and a hook section 108 connecting the front ends of the upper and lower coupling sections 106. The cloth-hook wire 102 is engagedly coupled to the frame bracket 34 by the lower hooks 104 at both two ends, each hook 104 being configured to be latched into or hung onto the hang holes 100 of the frame bracket 34. The upper and lower coupling sections 106 are L-shaped sections, which extend frontward from the lower hooks 104, passing between the bracket base 42 and the retainer base 50 to the front, to reach bend points frontward of and on the right (inner) side of the airbag module 23, at which points, the coupling sections 106 bend to extend outward (to the left). As shown in FIG. 9, the coupling sections 106 extend between the bracket base 42 and the retainer base 50, where, when being assembled, the coupling sections 106 are pressed against the bracket base 42 by the airbag module 23. This feature holds the cloth-hook wire 102 between the frame bracket 34 and the module bracket 36 to restrict the movement thereof.

As shown in FIG. 3, the vehicle seat 1 is provided with a stay cloth 110 for tearing open the skin cover 22 under the force of the bag inflation and deployment of the airbag 61. The stay cloth 110 is formed of a sheet-like material that is less elastic than the skin cover 22. One end of the stay cloth 110 is stitched to the front skin cover 91 and the left side skin cover 92 at the stitching line 95. The stay cloth 110 extends from the one end toward the hook section 108 of the cloth-hook wire 102. The other end of the stay cloth 110 is provided with one or more J-shaped hooks 112, which are configured to be hung onto the hook section 108 of the cloth-hook wire 102.

Figure 11:
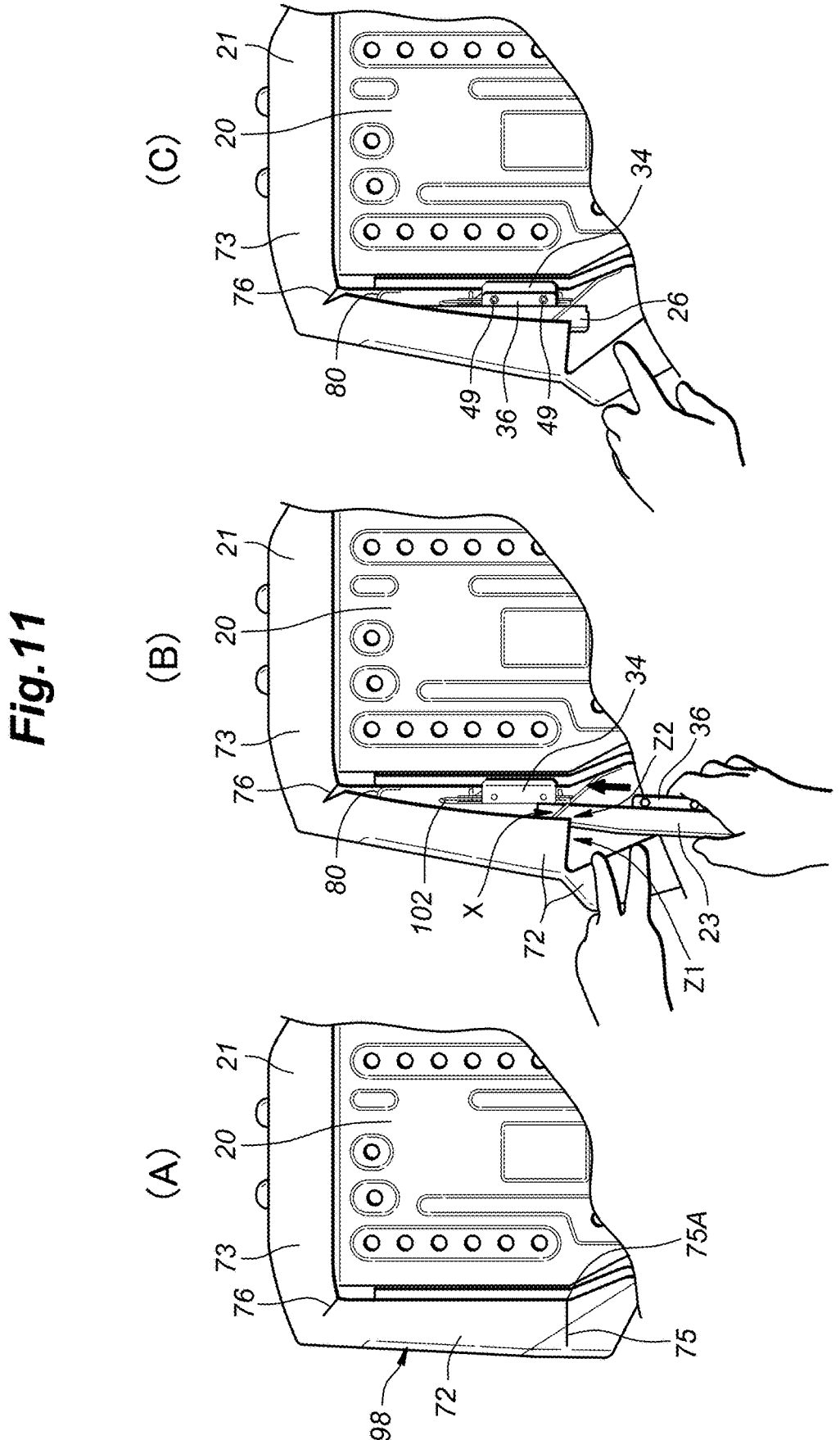
FIG. 11 is an explanatory diagram showing assembly of the airbag module, and (A), (B), and (C) illustrate before assembly, during assembly, and after assembly.

In the present embodiment, the hook section 108 includes a portion located frontward of the through-hole space X, and the stay cloth 110 is coupled to the cloth-hook wire 102 at least in part frontward of the through-hole space X. As shown in FIGS. 11(A) and 11(B), this feature enables a worker to, by bending or moving the rear pad member 72, make a visual check of the stay cloth 110 and the coupling of the stay cloth 110 to the cloth-hook wire 102 through the through-hole space X from the rear.

Next, how the vehicle seat 1 operates will be described. When the airbag 61 needs to be developed to protect occupants, e.g., in the event of a frontal collision, the inflator 62 is activated by a signal from a known control unit installed in the vehicle, to thereby supply gas to the inside of the airbag 61. As a result, the airbag 61 inflates and the housing 63 opens at the left front edge.

The gas supplied from the inflator 62 inflates the airbag 61 to the left, thereby applying a load to the stay cloth 110. The load applied to stay cloth 110 causes the stitching line 95 to break, forming an opening in the skin cover 22. The airbag 61 inflates to the left of the seatback 5 through the deployment hole 77 and the opening formed in the skin cover 22. As a result, the inflated airbag 61 is deployed between the occupants seated in the vehicle seat 1 and a vehicle compartment side wall.

Next, a method for assembling the vehicle seat 1 will be described. After welding the frame bracket 34 and the shape former 80 to the seatback frame outer portion 19, an assembling worker places the pad member 21 on the seatback frame outer portion 19, the frame bracket 34 and the shape former 80, as shown in FIG. 11(A). The rear surface of the front skin cover 91 and the right surface of the left side skin cover 92 are preferably pre-coupled (glued) to the front surface of the front pad member 70 and the left surface of the side pad member 71, respectively.

When the pad member 21 is placed over the seatback frame outer portion 19, the frame bracket 34 and the shape former 80, the front pad member 70, the side pad member 71, and the rear pad member 72 are positioned frontward, leftward, and rearward of the seatback frame outer portion 19, the bracket, and the shape former 80, respectively.

Then, as shown in FIG. 3, the rear of the front pad member 70 is in contact with the left side frame 26. As a result, the front pad member 70 and the shape former 80 (more specifically, the rear of the front pad member 70 and the right end portion of the shape former 80) are provided apart from each other in the front-back direction. As the right side of the side pad member 71 is in contact with the left end portion of the shape former 80, the right side surface of side pad member 71 and the left side surface of left side frame 26 are provided apart from each other in the left-right direction. As a result, a housing space Y is defined by the front pad member 70, the side pad member 71, the shape former 80, and the left side frame 26.

Next, the worker grasps the lower end of the rear pad member 72 and pulls it outward (i.e., rightward) to thereby open the slit 75. As shown in FIG. 11(B), the load applied to the rear pad member 72 also opens the auxiliary slit 76. As a result, the pad member 21 is bent along the slit 75 and the auxiliary slit 76.

The bend of the rear pad member 72 at the slit 75 forms a through-hole space Z1 in the rear pad member 72, and the lateral width of the through-hole space Z1 is wider than that of the airbag module 23. At the same time, an insertion hole Z2, which is laterally wider than the lateral width L2 of the airbag module 23, is formed between the left end R2 of the slit 75 and the shape former 80 (shape former lower portion 83).

While pulling the lower end of the rear pad member 72 outward (leftward), the worker inserts the cloth-hook wire 102 through the slit 75 between the left side frame 26 and the side pad member 71, and latches the hook 104 of the cloth-hook wire 102 into the hang hole 100. The worker then pulls the stay cloth 110 toward the cloth-hook wire 102 and hangs the hooks 112 of the stay cloth 110 onto the hook section 108 of the cloth-hook wire 102. Then, the hook section 108 of the cloth-hook wire 102 is located frontward of the through-hole spaces X and is visible from the rear through the through-hole space X. Thus, when the hooks 112 are hung on the hook section 108 of the cloth-hook wire 102, the worker can make a visual check of the coupling between the cloth-hook wire 102 and the stay cloth 110 (more specifically, the coupling between the hooks 112 and the hook section 108) through the through-hole space X. This configuration allows the worker to easily hang the hooks 112 onto the hook section 108, thereby facilitating the assembling of the vehicle seat 1.

Then, while pulling the lower end of the rear pad member 72 outward (leftward), the worker inserts the airbag module 23 fastened to the module bracket 36 through the slit 75 between the left side frame 26 and the pad member 21. Then, the worker pushes the airbag module 23 upward to thereby position the airbag module 23 in the housing space Y.

Next, while pulling the lower end of the rear pad member 72 outward, the worker places the airbag module 23 so that the module bracket 36 is aligned with the frame bracket 34, and inserts the stud bolts 48 into the bolt holes 52. As shown in FIG. 11(B), while pulling the lower end of the rear pad member 72 outward, the worker pulls and bends the pad member 21 along the slit 75 and the auxiliary slit 76. As a result, the slit 75 and the auxiliary slit 76 open, which ensures that the two fastening points P1 and P2 are more visible and accessible through the through-hole space X. The worker inserts the fastening tool into the through-hole space X and tightens the nuts 49, thereby fastening the module bracket 36 to the frame bracket 34. As a result, the airbag module 23 is coupled to the left side frame 26 via the module bracket 36 and the frame bracket 34.

The worker then positions the rear skin cover 93 along the rear surface of the rear pad member 72 and the rear surface of the pan frame 20, and couples the outer side edge of the rear skin cover 93 to the rear edge of the left side skin cover 92 using the slide fastener 97. In this way, the assembly of the vehicle seat 1 is completed.

Next, effects or technical benefits of the vehicle seat 1 will be described. In the vehicle seat, the left side frame 26 is provided with the shape former 80. The shape former 80 is in contact with the right side surface of the side pad member 71 to support the inner side of the side pad member 71. As a result, the shape former 80 forms the outer shape of the seatback 5 and serves to maintain the shape of the seatback 5 against loads applied thereto from the outside. This configuration enables the shaping of the outer shape of the seatback 5 as intended according to usage environment and other conditions by properly designing the shape of shape former 80.

Furthermore, the gap space W is formed between the lower half 82B of the shape former center portion 82 and the left side frame 26, which forms the through-hole space X extending in the front-rear direction. This feature enables a worker to access the two fastening points P1 and P2 through the gap space W (the through-hole space X) from the rear side, and insert a fastening tool (e.g., a wrench) to tighten the nuts 49 (fasteners). In this way, the worker can fasten the frame bracket 34 and the module bracket 36 to couple the airbag module 23 to the left side frame 26.

In the present embodiment, the module bracket 36 and the frame bracket 34 are fastened to each other at the two fastening points P1 and P2. The module bracket 36 and the frame bracket 34 are fastened to each other at a plurality of fastening points P, which enables a tighter coupling therebetween. In addition, the two fastening points P1 and P2 are both located frontward of the through-hole space X, which enables a worker to insert a fastening tool (e.g., universal wrench) from the rear of the shape former 80, and tighten the fasteners (the nuts 49).

Furthermore, when the airbag module 23 is assembled, the upper or lower edge of the module bracket 36 is visible from the rear through the gap space W (the through-hole space X) between the left side frame 26 and the shape former 80. This configuration enables a worker to accurately grasp the position of the module bracket 36 when assembling the airbag module 23, which enables a worker to easily place the airbag module 23 at the proper position.

In the present embodiment, the top edge and the lower edge of the module bracket 36 and the top edge and the lower edge of the frame bracket 34 are visible from the rear through the through-hole space X. This configuration enables a worker to easily and accurately grasp the vertical positions of the module bracket 36 and the frame bracket 34 through the through-hole space X. This further enables the worker to easily position the module bracket 36 and the frame bracket 34 in alignment with each other, thereby improving the efficiency of the work of assembling the module bracket 36.

The module bracket 36 and the frame bracket 34 are fastened at the two fastening points P1 and P2, which are both located frontward of the through-hole space X. This configuration enables a worker to insert a fastening tool from the rear and tighten the fasteners, thereby fastening the frame bracket 34 to the module bracket 36.

The upper part of the shape former 80 is curved to extend downward at the inner end, thereby forming an upper attachment section 85 as viewed from the front. The shape former 80 is welded to the left side surface of the left side frame at the upper attachment section 85. As a result, the upper portion of the shape former 80, which is curved to extend downward at the inner end, does not protrude upward so much compared to the upper portion of the shape former 80 curved to extend upward. This configuration reduces the vertical size of the shape former 80.

The left side frame 26 has a bead 89, which provides the increased stiffness to the side frame 26, and the lower attachment section 87 is welded to a location near the edge 89B of the bead, which enables the shape former 80 to be joined to a stiffened portion of the side frame 26. This configuration prevents the shape former 80 from being moved by an external load, which ensures that the side frame 26 supports the shape former 80 in a more secure manner.

The side frame 26 includes the frame bend section 30 in which the side frame is bent inward, which enables the side frame 26 to be made stiffer. The lower portion of the shape former 80 is coupled to the side frame 26 at a location below the frame bend section 30. The side frame 26 having the inwardly bent section enables the lower part of the seatback to be made with a reduced lateral width. This feature enables the seatback to be formed so as to conform to the shape of a human body.

The shape former center portion 82 extends along the outer surface of the airbag module 23, which prevents the formation of a gap space between the shape former center portion 82 and the outer side surface of the airbag module 23. This feature enables the seatback 5 to be made with a less stepped front surface, which improves the appearance of the vehicle seat 1.

The upper half portion 82A of the shape former 80 extends along the outer edge of the pan frame protrusion 32. In this configuration, the shape former 80 reinforces the outer edge of the pan frame protrusion 32, which provides the increased stiffness to the seatback frame 18.

After the airbag module 23 is assembled, more specifically, when the airbag module 23 is placed in the housing space Y and the module bracket 36 and the frame bracket 34 are fastened to each other, the shape former 80 and the airbag module 23 are spaced apart from each other in the front-rear direction to thereby form a gap space therebetween. In this way, the shape former 80 and the airbag module 23 are arranged to be sufficiently spaced apart from each other, which enables a worker to easily insert the airbag module 23 between the shape former 80 and the side frame 26. In other words, this feature enables the worker to easily place the airbag module 23 in the housing space Y, which improves the efficiency of the work of assembling the airbag module.

Second Embodiment

Figure 12:
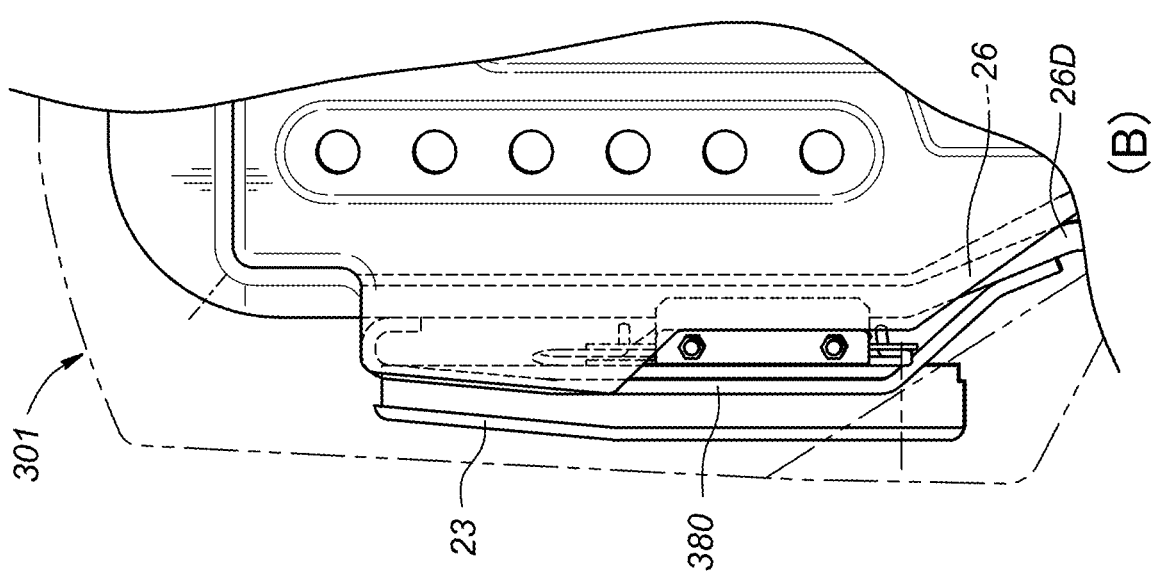
FIG. 12 is a rear view of vehicle seats according to other embodiments of the first aspect of the present invention, and (A) and (B) show second and third embodiments of the present invention, respectively.
Figure 12:
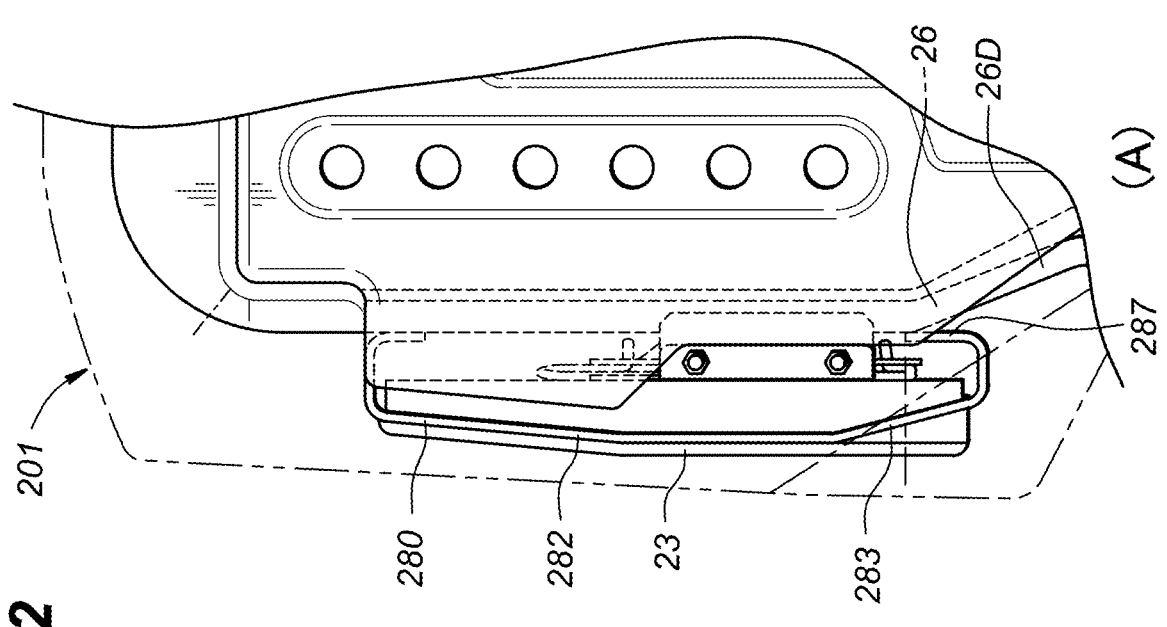

As shown in FIG. 12(A), a vehicle seat 201 according to a second embodiment of the present inventions is different from the vehicle seat 1 of the first embodiment in the shape of a lower portion of a shape former 280. The other features of the second embodiment are similar to those of the first embodiment. Thus, the description of such similar features will be not repeated here and the shape of the lower portion of a shape former 280; that is, the shape of a shape former lower portion 283 will be described here.

As shown in FIG. 12(A), the shape former lower portion 283 extends laterally inward. The lower attachment section 287 is formed by the folding of a lower inner end portion of the shape former 280 upward. The lower attachment section 287 is welded to the left side surface of the left side frame lower portion 26D at a location above the frame bend section 30.

Next, the effects or technical benefits of the vehicle seat 201 will be described. In the vehicle seat 201, the lower attachment section 287 is formed by the folding of a lower inner end portion of the shape former 280 upward. This feature reduces the vertical size of the shape former 280, thereby facilitating the work of assembling the pad member 21, which improves the efficiency of the work of assembling the vehicle seat 201.

Third Embodiment

As shown in FIG. 12(B), a vehicle seat 301 according to a third embodiment of the present inventions is different from the vehicle seat 1 of the first embodiment in the shape of a shape former 380. The other features of the third embodiment are similar to those of the first embodiment. Thus, the description of such similar features will be not repeated here and the shape of the shape former 380 will be described below.

As shown in FIG. 12(B), the shape former 380 of the third embodiment differs from the first embodiment in that the shape former 380 is formed of a pipe having a larger diameter than that of the shape former of the first embodiment, and that the shape former center portion 282 is located close to the left side frame 26 compared to that of the first embodiment. The remaining features are substantially same as those of the first embodiment. The shape former center portion 282 is provided at a position on the inner side of the outer surface of the airbag module 23 as viewed from the rear. In the present embodiment, the shape former center portion 282 is positioned on the inner side (right side) of the center line of the airbag module 23 in the rear view.

Next, effects or technical benefits of the vehicle seat 301 will be described. The shape former 380 of the third embodiment is formed of a pipe with a larger outer diameter than the first embodiment, which increases the stiffness of the shape former 380 compared to the first embodiment, thereby enabling the seatback 5 to be made more durable than the first embodiment.

A middle portion of the shape former 380 of the third embodiment is positioned on the inner side (right side) compared to the first embodiment. This feature reduces the lateral size of the shape former 380, thereby facilitating the work of assembling the pad member 21, which improves the efficiency of the work of assembling the vehicle seat 301.

Fourth Embodiment

Embodiments in which a vehicle seat according to the present invention is used as a front passenger seat of a vehicle (an example of the vehicle seat) will be described with reference to the appended drawings. In the following description, the front/rear, left/right, and up/down directions are defined relative to an occupant seated in the vehicle seat. The terms "outer side" and "inner side" refer to directions away from and toward a seated occupant, respectively.

Figure 14:
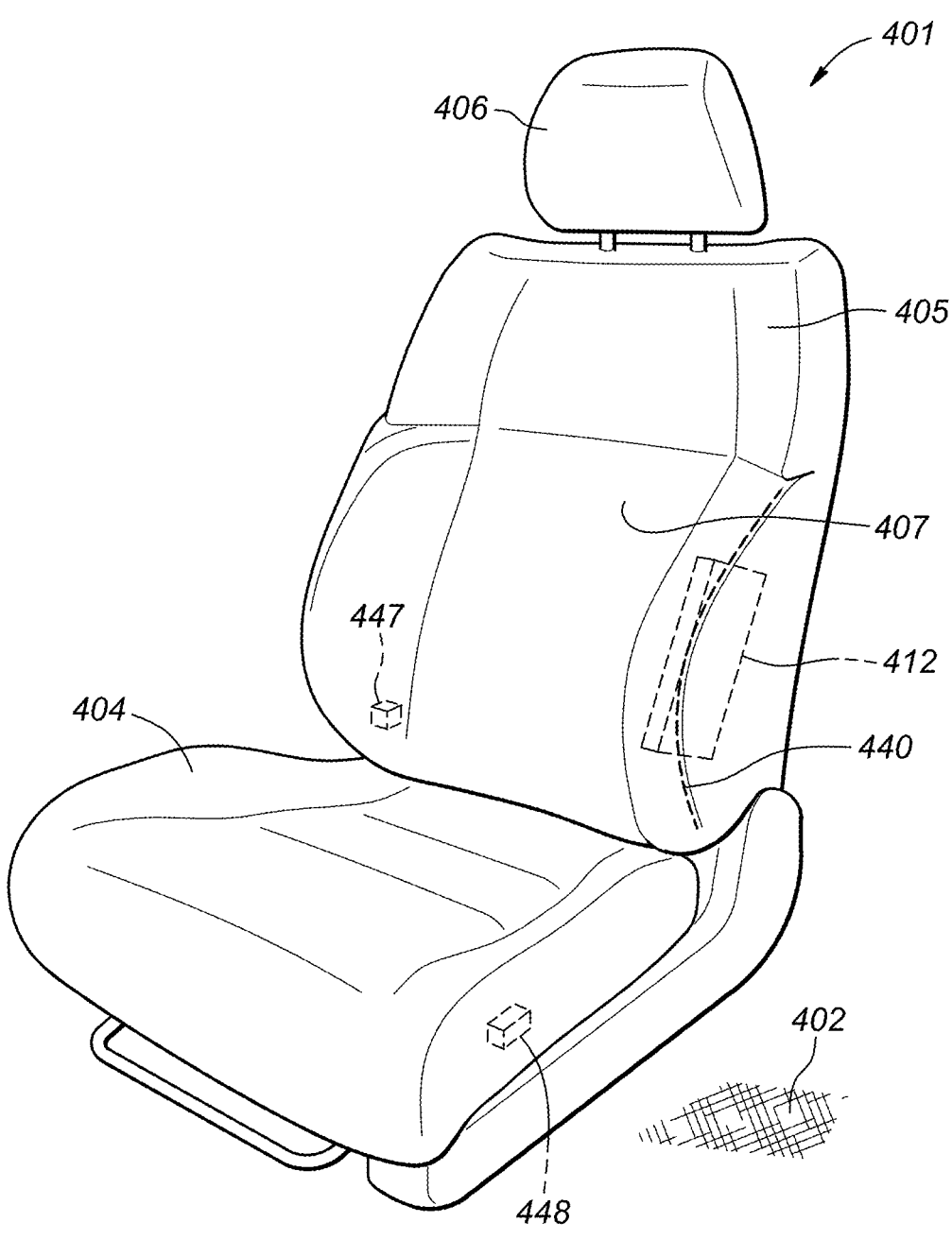
FIG. 14 is a perspective view of a vehicle seat according to a fourth embodiment of the present invention.

As shown in FIG. 14, a vehicle seat 401 according to the present invention is provided on a floor 2 of a vehicle, and includes a seat cushion 404 adapted to support a seated occupant, a seatback 405 supported at the rear of the seat cushion 404 and functioning as a back recline, and s headrest 6 provided on the top of the seatback 405.

The seatback 405 extends vertically and has a generally box-like shape with a surface facing frontward. A support surface 407 is formed on the front surface of the seatback 405 to support the backs of two occupants. The lower end of the seatback 405 is rotatably coupled to the rear end of a frame, the frame being provided to support the seat cushion 404, by using a known reclining mechanism.

Figure 16:
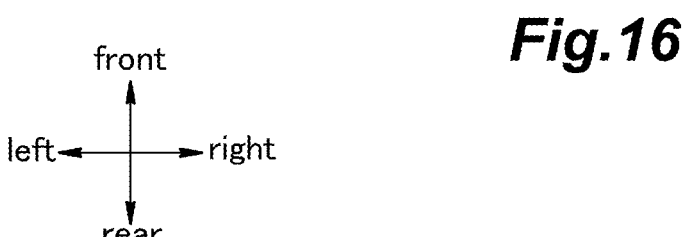
FIG. 16 is cross-sectional view taken along line XVI-XVI in FIG. 14.
Figure 17:
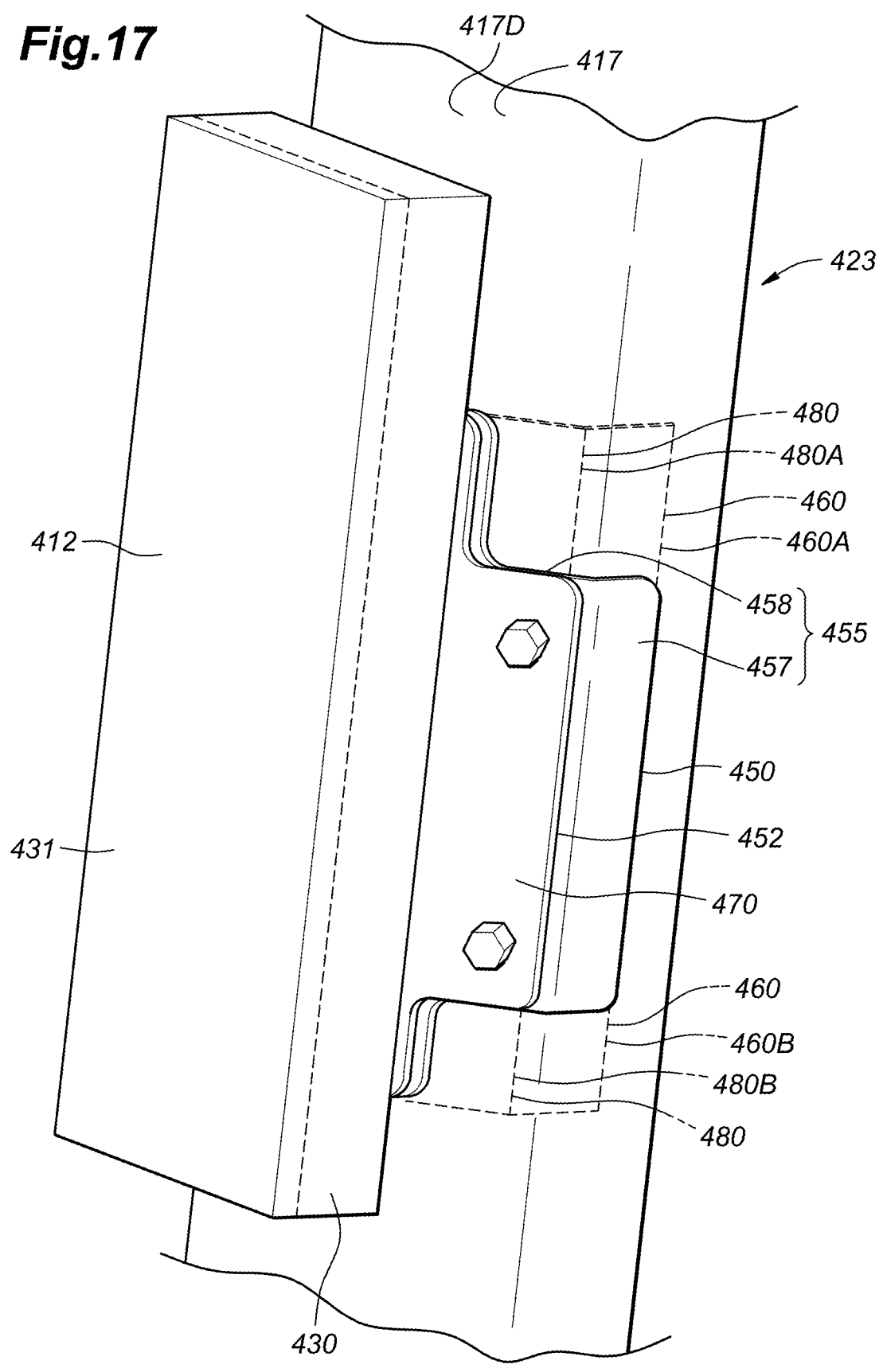
FIG. 17 is a perspective view of part of a seatback frame where an airbag module is attached.

Next, the configuration of the seatback 405 will be described with reference to FIGS. 15, 16 and 17. As shown in FIG. 16, the seatback 405 includes a seatback frame 409 (seat frame) configured to form a framework of the seat, a pad member 410 supported by the seatback frame 409, a skin cover 411 provided on the surface of the pad member 410 to form an outer surface of the seatback 405, and an airbag module 412 supported on the seatback frame 409.

Figure 15:
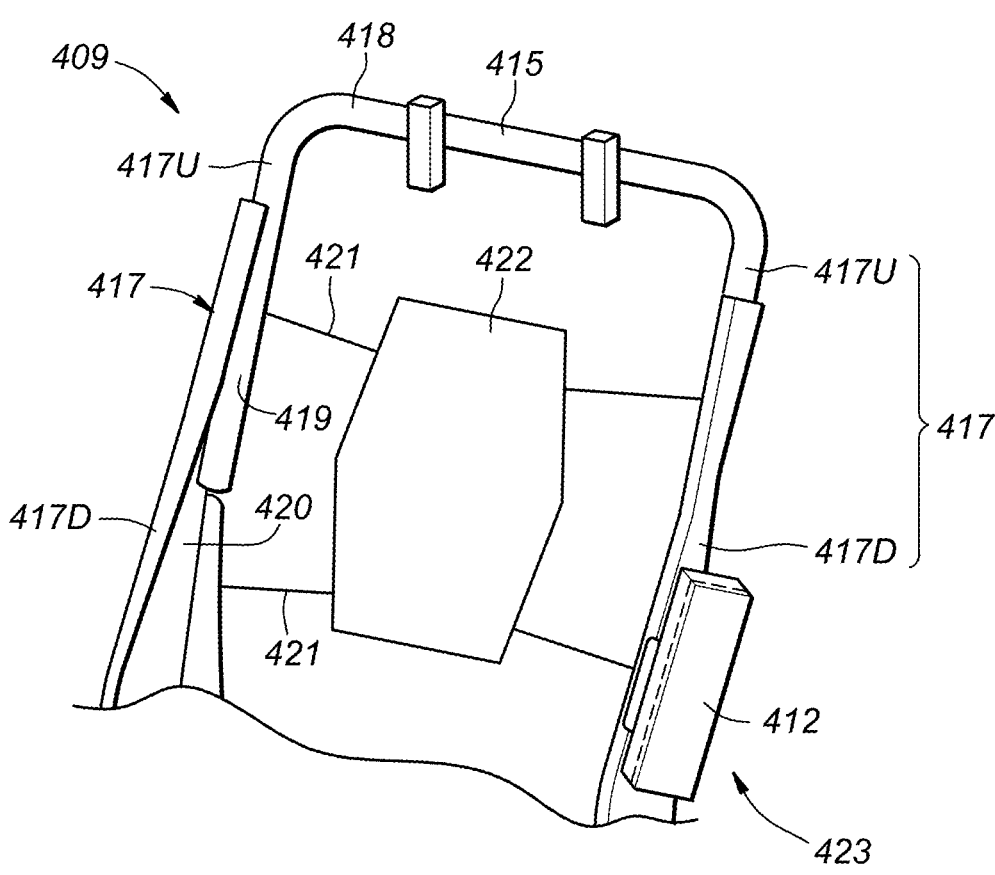
FIG. 15 is a perspective view of a seatback frame of the vehicle seat of the fourth embodiment of the present invention.

As shown in FIG. 15, the seatback frame 409 forms the framework of the seatback 405, and includes a seatback frame outer portion 415 that forms a rectangular frame. The seatback frame outer portion 415 includes left and right side frames 417 (side members) extending vertically, an upper frame 418 that is a cross member extending in the left-right direction and coupled to the upper ends of the left and right side frames 417, and a lower frame (not shown) that is a cross member extending in the left-right direction and coupled to the lower portions of the left and right side frames 417. The side frame upper portion 417U and the upper frame 418 constitute the upper portions of the left and right side frames 417, and are formed by the bending of one circular pipe 419 into an inverted U-shaped. Side frame lower portions 417D are the lower portions of the left and right side frames 417, and are formed by sheet metal members 420 each having opposing left and right surfaces (i.e., surfaces facing away from each other in the left-right direction). The inner sides of the top portions of the sheet metal members 420 are welded to the lower ends of the pipe 419. The front and rear edges of each of the sheet metal members 420 are bent inward of the seat. The lower ends of the left and right side frames 417 are rotatably coupled to the frame for supporting the seat cushion 404 by a reclining mechanism.

An elastic member(s) 421 is crossed between the left and right side frames 417. The front surface of the elastic member 421 is provided with a plate-shaped bridge member 422 having front and rear surfaces facing away from each other in the front-rear direction. The bridge member 422 is displaceable frontward and rearward with regard to the side frames 417 by the elastic force provided by the elastic member, and supports the back of an occupant by the elastic force. In the present embodiment, the bridge member 422 is formed of a plate-shaped member, which is not limiting. The bridge member 422 may be formed of any means for providing a lumbar support function (e.g., spring).

The airbag module 412 is coupled to the left surface of the left side frame lower portion 417D via an airbag module support structure 423. The airbag module 412 has a generally box-like shape extending along the side frame 417 and is positioned so that the outer surface of the airbag module 412 faces to the left (outside).

As shown in FIG. 16, the airbag module 412 includes an airbag 425, an inflator 426 configured to release gas into the airbag 425 to inflate and deploy the airbag 425, and a generally box-like shaped housing 427 that houses the airbag 425 and inflator 426. The inflator 426 is provided with male threaded protrusions 428 each having a generally cylindrical shape and protruding radially to the outside from the circumference of the inflator.

The housing 427 has the generically box-like shape, and includes a housing body 430 with an opening on the left side and a plastic lid 431 for covering the opening of the housing body 430. The housing body 430 has a generally rectangular cylindrical shape with a generally rectangular bottom wall 430A and side walls joined to the outer edges of the bottom wall. An outer surface of housing body 430, including the outer surface of the bottom wall 430A, is coated with a plastic material. The bottom wall of the housing body 430 has a through hole 430B extending therethrough in the thickness direction at a predetermined position. The airbag 425 is folded and housed in the housing body 430.

The lid 431 has a generally rectangular shape, and is formed of a plastic plate with left and right surfaces facing away from each other in the left-right direction. In the present embodiment, a tubular portion 431A protruding in a square cylindrical shape on the side of the housing body 430 is joined to the outer peripheral edge of the lid 431 and the tubular portion 431A is configured to fit onto the opening of the housing body 430. Formed on the outer circumference of the tubular portion 431A are a plurality of radially projecting retaining claws 431B. The claws are latched into a plurality of through holes 430C formed in the side wall of the housing body 430, which couples the lid 431 to the housing body 430.

The lid 431 has a grooved breakable line 431C (tear-off line) along the front left vertical edge, and a thin-walled hinge 431D along the rear left vertical edge. As a result, when a leftward load is applied to the lid 431, the lid 431 tears open along the breakable line 431C, causing a center portion of the lid 431 to rotate around the hinge 431D, which opens the housing body 430.

The pad member 410 is formed of a flexible cushioning material such as polyurethane foam. As shown in FIG. 16, the pad member 410 includes a front pad member 434 located behind (i.e., the rear side of) the support surface 407 and a left side pad member 435 extending rearward from the left side edge of the front pad member 434. The front pad member 434 and the left side pad member 435 are each formed of a separate cushioning material. The front pad member 434 extends, passing in front of the side frame 417, to the left front of the airbag module 412. The left side pad member 435 extends rearward from the left front of the airbag module 412, passing along the left side of the airbag module 412, to reach the outer side of the rear end of the left side frame 417.

The skin cover 411 is formed by the sewing together of a plurality of sheet-like members such as cloth and leather. The skin cover 411 includes a front skin cover sheet 437 for covering the front surface of the front pad member 434 and a left side skin cover sheet 438 for covering the left side of the left side pad member 435. The left edge of the front skin cover sheet 437 and the front edge of the left side skin cover sheet 438 are stitched to each other, forming a stitching line 440. The stitching line 440 serves as a breakable line in the skin cover 411 that is breakable under a smaller load than the other stitches. As shown in FIG. 14, the stitching line 440 extends vertically along the left front edge of the seatback 405.

The vehicle seat 401 is provided with a stay cloth 442 for directing the deployment of the airbag 425. The stay cloth 442 is a fabric member sewn to the stitching line 440 at one end and coupled to the side frame 417 via the airbag module support structure 423. Thus, when the airbag 425 inflates frontward, a load is applied to the stay cloth 442 to cause the break and opening of the stitching line 440.

Provided on the rear side of the seatback frame 409 is a back sheet member 444 formed of a sheet-like member such as cloth or leather in the same manner as the skin cover 411. One end of the back sheet member 444 is coupled to the rear edge of the left side skin cover sheet 438 by a slide fastener 446.

As shown in FIG. 14, a sensor 447 is provided at the bottom of the vehicle seat 401 and configured to detect a load applied to an occupant seated in the front passenger seat. The sensor 447 may be, for example, a tension sensor for detecting tension applied to a seat belt worn by an occupant or an acceleration sensor for detecting acceleration of the vehicle seat 401. A control unit 448 is provided in the lower part of the vehicle seat 401, which is electrically connected to the sensor 447 and the inflator 426 and configured to control the drive of the inflator 426 in response to the load detected by the sensor 447. In the present embodiment, the sensor 447 and the control unit 448 are provided in the vehicle seat 401. However, in other embodiments, the sensor 447 and the control unit 448 may be provided at any position in the vehicle in which the vehicle seat 401 is mounted.

Next, the airbag module support structure 423 will be described in detail. As described above, the airbag module support structure 423 couples the airbag module 412 to the side frame 417 and also couples the stay cloth 442 to the side frame 417. In the following description of the airbag module support structure 423, the front side (support surface side) of the seatback frame 409 is described as the front side, and the rear side of the seatback frame 409 is described as the rear side. Furthermore, the vertical direction is defined as the direction in which the side frame 417 extends.

As shown in FIG. 16, the airbag module support structure 423 includes a bracket 450 provided at the side frame lower portion 417D, a wire member 451 for coupling the stay cloth 442 to the bracket 450, and a retainer 452 for holding the airbag module 412.

The bracket 450 is a folded sheet metal member and forms part of the side frame 417. The bracket 450 includes a bracket coupler portion 455 coupled to the rear surface of the side frame lower portion 417D and extending to the left of side frame lower portion 417D, and the bracket 450 also includes a bracket flat portion 456, which is a plate-shaped portion extending frontward from the left edge (lateral outer edges) of the bracket coupler portion 455. The bracket coupler portion 455 includes a bracket coupler contact section 457 coupled to the rear surface of the side frame lower portion 417D, and a bracket coupler slope section 458 extending diagonally frontward to the left from the left edge (laterally outer edge) of the bracket coupler contact section 457. The rear end of the bracket flat portion 456 is connected to the front edge of the bracket coupler slope section 458. In the present embodiment, the bracket 450 further includes a plate-shaped bracket front end section 459 extending to the right from the front edge of the bracket flat portion 456 to reach the front surface of the side frame lower portion 417D. The bracket coupler contact section 457 and the bracket front end section 459 are welded to the rear surface of side frame lower portion 417D and the front surface of the side frame lower portion 417D, respectively, whereby the bracket 450 is secured to the side frame lower portion 417D. As a result, the bracket flat portion 456 forms a plate-like portion 417S of the side frame 417, such that the plate-like portion 417S is spaced apart to the outer (left) side from an outer surface contour 417C of the side frame lower portion 417D (FIG. 19).

Figure 18:
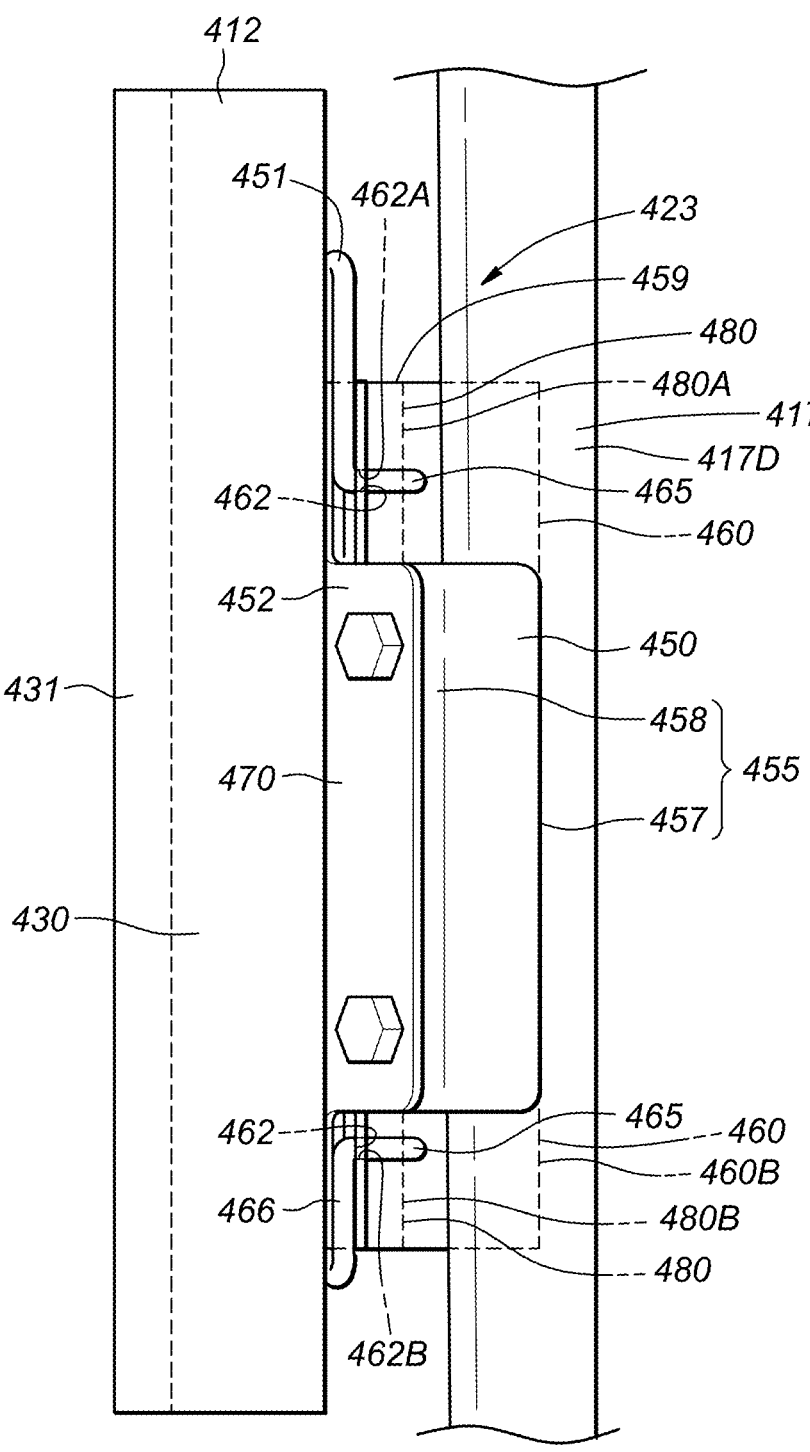
FIG. 18 is a rear view of the part of the seatback frame where the airbag module is attached.
Figure 19:
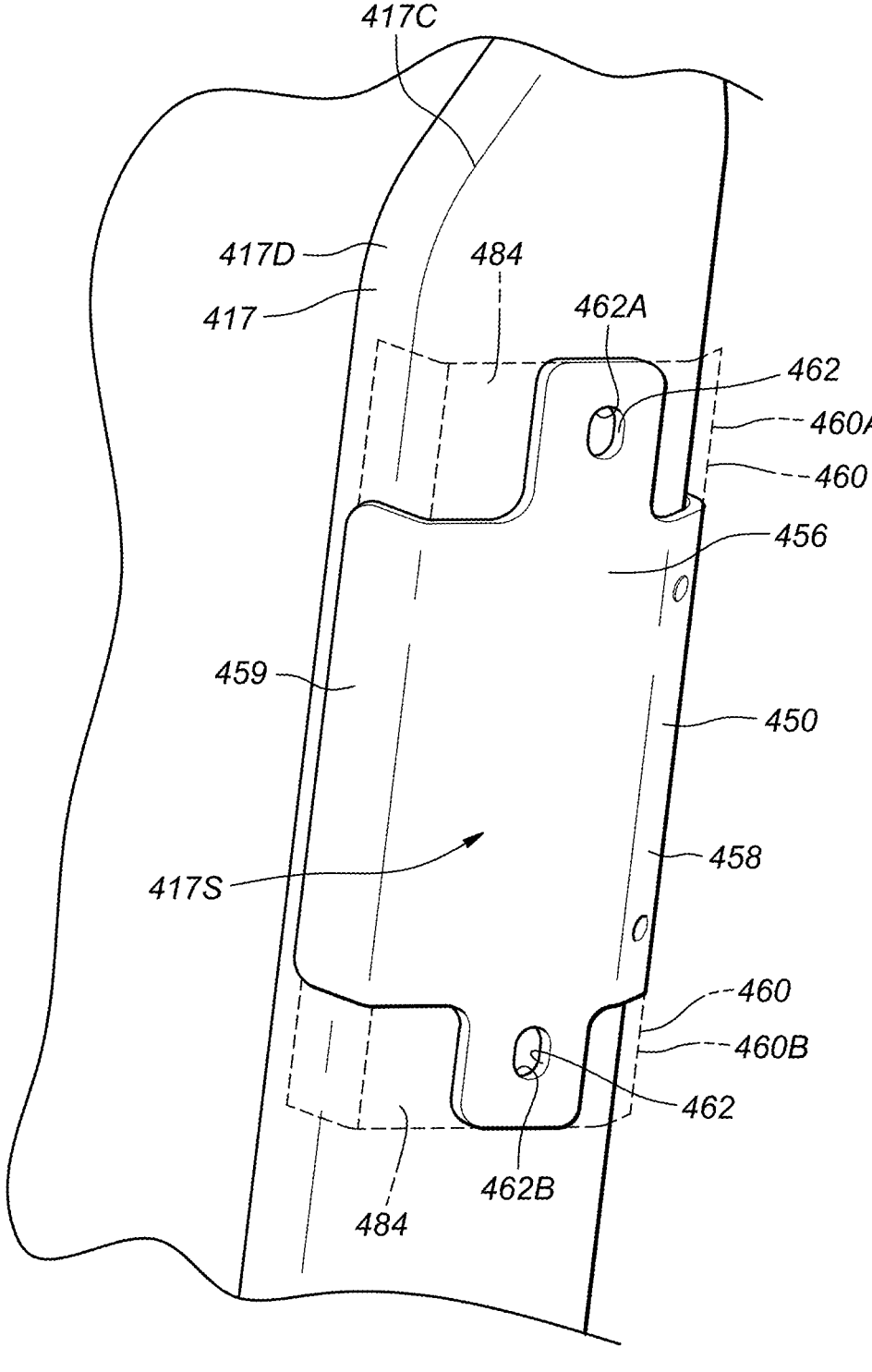
FIG. 19 is a perspective view, as viewed from the front, of part of a side frame lower portion where a bracket is provided, showing immediately after the coupling of the bracket to the side frame during assembly.
Figure 20:
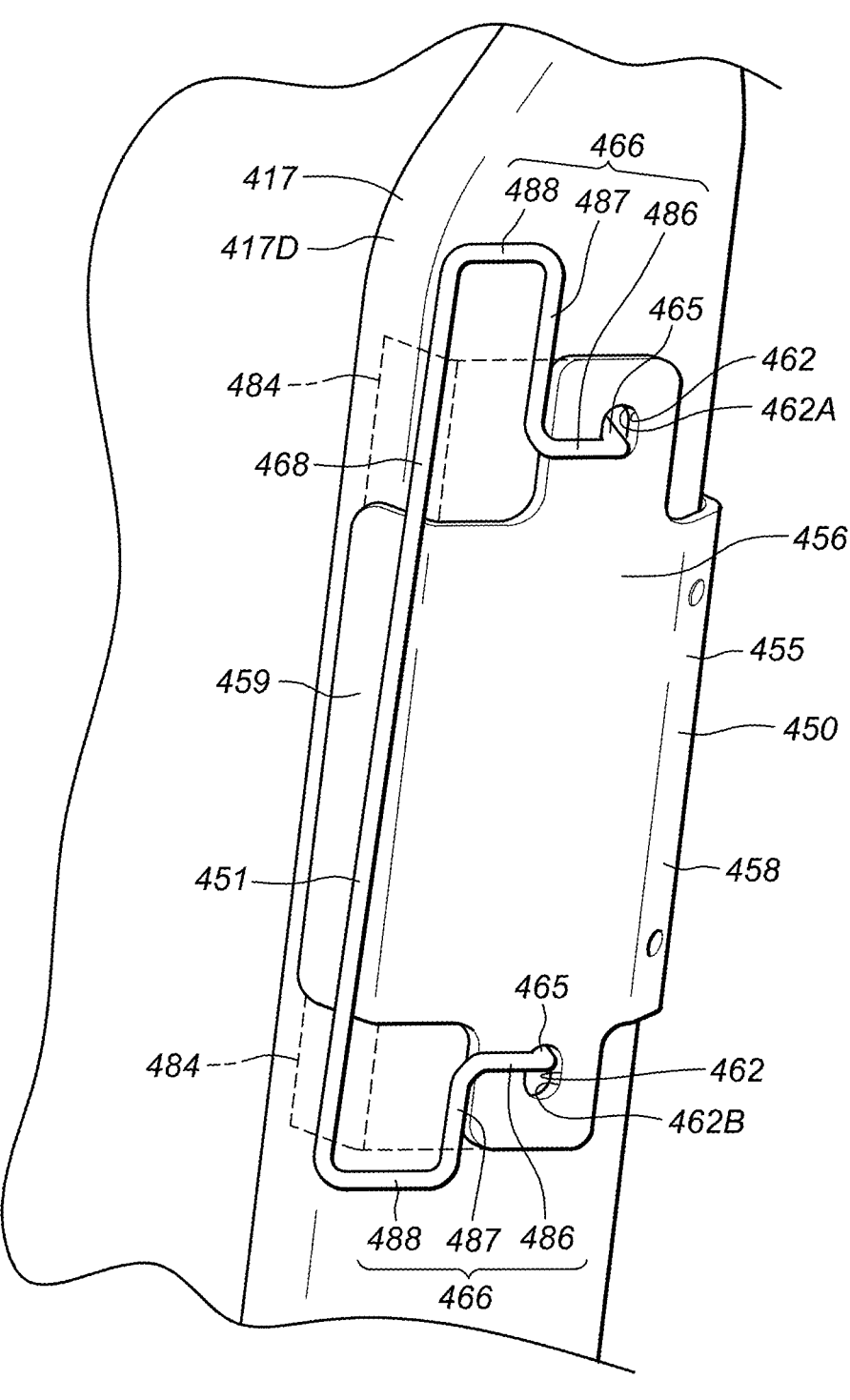
FIG. 20 is a perspective view, as viewed from the front, of the part of the side frame lower portion where the bracket is provided, showing immediately after the coupling of a wire member to the bracket during assembly.

In the present embodiment, as shown in FIG. 19, the bracket 450 is formed by the bending of a generally square sheet metal member along one edge. The bracket coupler contact section 457, the bracket coupler slope section 458, the bracket flat portion 456, and the bracket front end section 459 each have a generally square shape extending in the vertical direction. As shown in FIGS. 17 and 19, the bracket 450 is shaped to have generally square cutouts 460 at the upper and lower rear corners thereof, such that the upper and lower cutouts extend from the right (inner) edge of the bracket coupler contact section 457 (FIG. 18) to the rear edge of the bracket flat portion 456 (FIG. 20). As a result, the vertical size (length) of the bracket coupler slope section 458 and the bracket coupler contact section 457 is smaller than that of the bracket flat portion 456.

As shown in FIG. 19, the bracket flat portion 456 defines two hang holes 462 extending through it in the thickness direction at positions that are vertically aligned to each other. The two hang holes 462 are located frontward of the corresponding bracket cutouts 460. More specifically, the upper hang hole 462A is located above the lower edge of the upper bracket cutout 460A, and the lower hang hole 462B is located below the upper edge of the lower bracket cutout 460B.

As shown in FIG. 20, the wire member 451 is formed by the bending of a round metal bar. The wire member 451 includes a pair of J-shaped wire hook sections 465 configured to be latched into the corresponding hang holes 462 from the outer side of the bracket, and a pair of Z-shaped wire extension sections 466 extending from the outer ends of the wire hook sections 465 and frontward of the left surface of the bracket flat portion 456. The front ends of the wire extension sections 466 are connected by a stay cloth coupling section 468 that extends vertically. In the present embodiment, each of the wire hook sections 465 is formed by the bending of an end of the wire member 451 into a hook shape (i.e., J shape).

Figure 21:
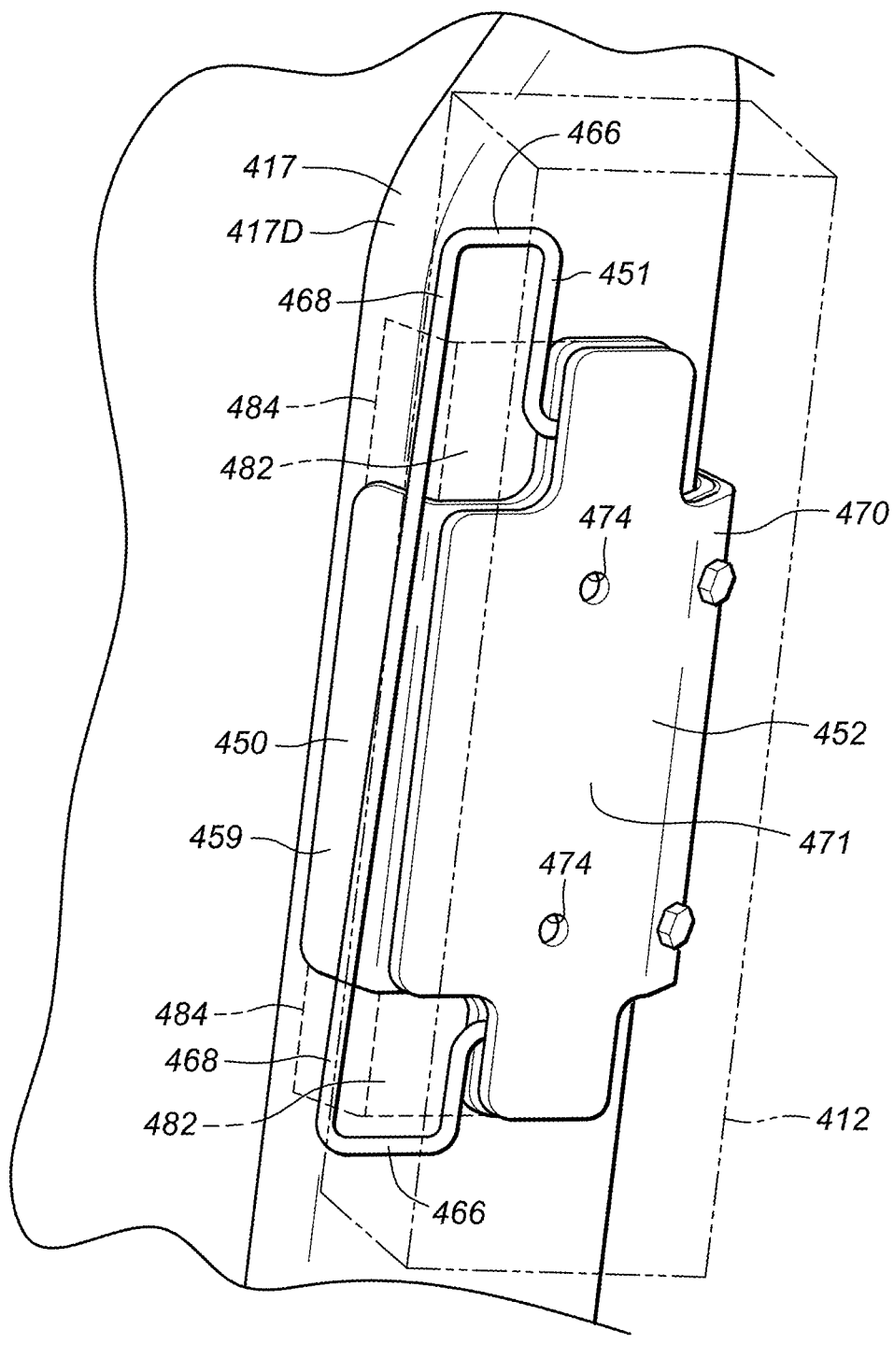
FIG. 21 is a perspective view, as viewed from the front, of the part of the side frame lower portion where the bracket is located, showing immediately after the coupling of a retainer and an airbag module to the bracket during assembly.

As shown in FIG. 21, the retainer 452 is coupled to the bracket coupler portion 455, more specifically, coupled to the bracket flat portion 456, and includes a retainer coupler portion 470 extending over and along the outer side of the bracket flat portion 456, and a retainer flat portion 471 extending frontward from the left edge of the retainer coupler portion 470 and over the outer side of the bracket flat portion 456 such that the retainer flat portion 471 faces the outer side of the bracket flat portion with the wire member 451 located therebetween. In the present embodiment, the retainer coupler portion 470 has a plate shape portion inclined frontward to the left and extending along the outer surface of the bracket coupler slope section 458, and the retainer coupler portion 470 is fastened to the outer surface of the bracket coupler slope section 458 by bolts that are inserted holes extending through the bracket and the retainer. However, this configuration is not limiting. For example, the retainer coupler portion 470 may be welded or otherwise joined to the rear surface of the side frame lower portion 417D. As shown in FIG. 16, the retainer flat portion 471 is provided with through holes 474 extending through it in the thickness direction, and is configured such that male threaded protrusions 428 of the airbag module 412 are inserted into the through hole 474. The airbag module 412 is coupled to the retainer 452 by the fastening of the male threaded protrusions 428 to the retainer 452. In other words, the airbag module 412 is coupled to the side frame 417 and supported by the airbag module support structure 423. In FIG. 21, the airbag module 412 is indicated as a double-dotted line.

As shown in FIG. 16, the bracket flat portion 456 and the retainer flat portion 471 are provided apart from each other in the left-right direction, and the wire extension sections 466 are located therebetween. When the bracket 450 and the retainer 452 are coupled to each other, the wire extension sections 466 are held by the bracket flat portion 456 and the retainer flat portion 471, which prevents the wire member 451 from falling out. In this way, the retainer 452 couples the airbag module 412 to the side frame 417 and cooperates with the bracket 450 to prevent the wire member 451 from falling out.

As shown in FIG. 21, the retainer 452 is formed by the bending of a single sheet metal member having a generally square shape in a similar manner to the bracket 450, and the retainer coupler portion 470 and the retainer flat portion 471 each have generally square shape and extend in the direction in which the side frame 417 extends. The retainer 452 is shaped to have a pair of upper and lower retainer cutouts 480, each having a generally square shape, at the upper and lower rear corners thereof, such that the retainer cutouts 480 extend from the rear edge the retainer coupler portion 470 to the rear edge of the retainer flat portion 471. As a result, the vertical size (length) of the retainer coupler portion 470 is smaller than that of the retainer flat portion 471. The vertical size of the retainer coupler portion 470 is substantially the same as that of the bracket coupler slope section 458, and the vertical size of the retainer flat portion 471 is substantially the same as that of the bracket flat portion 456. The upper and lower edges of the retainer flat portion 471 are aligned with the upper and lower edges of the bracket flat portion 456, respectively, and the upper and lower edges of the retainer coupler portion 470 are aligned with the upper and lower edges of the bracket coupler slope section 458, respectively. As shown in FIG. 17, the retainer cutouts 480 are aligned with the bracket cutouts 460 each other, respectively, to form spaces extending through both sets of the cutouts, and the retainer cutouts 480 are located rearward of the bracket cutouts 460 and rearward of the two hang holes 462. In other words, the upper and lower retainer cutouts 480A and 480B are located rearward of the upper and lower hang hole 462A and 462B, respectively.

As shown in FIG. 21, the retainer 452 has retainer front cutouts 482, each having a generally square shape, at the front corners thereof so that the retainer front cutouts 482 are located frontward of the hang holes 462. As shown in FIG. 19, the bracket 450 has also bracket front cutouts 484 at the front corners thereof so that the bracket front cutouts 484 are located frontward of the hang holes 462 in a similar manner to the retainer front cutouts 482. The Z-shaped wire extension sections 466 extend from the front ends of the wire hook sections 465. The wire extension sections 466 include rear horizontal sub-sections 486 extending frontward from the hang holes 462 to reach points over the respective front cutouts 484 and 482 of the retainer and the bracket, vertical sub-sections 487 vertically extending from the front ends of the rear horizontal sub-sections 486 and spaced apart from the bracket flat portion 456 and the retainer flat portion 471; and front horizontal sub-sections 488 extending frontward from the protruding end of the vertical sub-sections 487 to reach points frontward of the front edges of the retainer flat portion 471 and the bracket flat portion 456. As shown in FIG. 21, the wire extension sections 466 protrude frontward (i.e., in the direction away from the bracket coupler contact section 457) from between the bracket flat portion 456 and the retainer flat portion 471, and the front edges of wire extension sections 466 are located frontward of the front edges of the retainer flat portion 471 and the bracket flat portion 456. Thus, the stay cloth coupling section 468, which vertically extends and connects the front ends of the wire extension sections 466 (the front ends of the front horizontal sub-section 488), is located frontward of the front edges of bracket flat portion 456 and the retainer flat portion 471. The vertical distance between the front edges of the wire extension sections 466 is longer than that between the rear edges thereof, resulting in a longer stay cloth coupling section 468, which enables the deployment of the airbag 425 to be directed over a wider area in the vertical direction.

As shown in FIG. 16, the wire extension sections 466 slightly bend frontward and outward at the front horizontal sub-sections 488. As a result, the front end point of the wire extension sections 466 is located further outward than the wire hook sections 465. In the present embodiment, the front ends of the wire extension sections 466 and the stay cloth coupling section 468 are in contact with the right (inner) surface of the airbag module 412, more specifically, the right surface of the bottom wall 430A of the housing body 430.

The stay cloth 442 is provided to extend to inside of the vehicle seat 401 from the stitching line 440 between the skin cover sheets through a space between the front pad member 434 and the left side pad member 435, to reach the stay cloth coupling section 468. One or more hooks 492 are sewn to the inner edge of the stay cloth 442, and the hooks 492 are configured to be hung onto the stay cloth coupling section 468, thereby coupling the stay cloth 442 to the side frame 417. In other words, one end (the front end) of the stay cloth 442 is sewn to the skin cover 411, and the other end (rear end) is hung onto the front end of the extension sections of the wire member 451 (i.e., the stay cloth coupling section 468 of the wire member 451). In this way, the stay cloth 442 is coupled to the side frame 417 by the airbag module support structure 423.

Next, a method for assembling the vehicle seat 401 and effects or technical benefits of the vehicle seat 401 will be described. In the first step of the process of assembling the vehicle seat 401, as shown in FIG. 19, an assembling worker welds the bracket coupler contact section 457 of the bracket 450 to the pre-assembled seatback frame outer portion 415, and also welds the bracket coupler contact section 457 of the bracket 450 to the rear surface of the side frame lower portion 417D. As a result, the bracket 450 is secured to the side frame lower portion 417D. In the next step, the assembly worker places the pad member 410 covered with the skin cover 411 on the front side of the seatback frame 409 and latches the wire hook sections 465 of the wire member 451 onto the hang holes 462 as shown in FIG. 20. Then, the assembly worker hangs the hooks 492 of the stay cloth 442 onto the stay cloth coupling section 468. Next, after coupling the airbag module 412 to the retainer 452, the assembly worker fastens the retainer coupler portion 470 to the bracket coupler slope section 458, as shown in FIG. 21. The assembly worker then joins the skin cover 411 to the back sheet member 444, resulting in the completion of assembly of the vehicle seat 401.

In the step of fastening the retainer 452 to the bracket 450, the wire member 451 is only latched to the bracket 450, resulting in a risk that the wire member 451 comes off from the bracket 450. Thus, the step of fastening the retainer to the bracket 450 (FIG. 21) is preferably configured to allow a worker to make a visual check of the coupling of the wire hook sections 465 to the hang holes 462, enabling the worker to confirm whether or not the wire member 451 is properly coupled to (i.e., not come off) the bracket 450.

The bracket 450 and the retainer 452 are provided with the respective pairs of cutouts 460 and 480 located rearward of the hang holes 462, which allows the assembly worker to make a visual check of the coupling of the wire hook sections 465 to the hang holes 462 through the pairs of the cutouts 460 and 480 from the rear of the seatback frame 409, as shown in FIG. 18. In this way, the worker is allowed to easily confirm whether the wire member 451 is properly coupled to the side frame 417 during assembly.

When a load exceeding a predetermined level is applied to an occupant seated in the vehicle seat 401 due to a vehicle collision or any other reason, the sensor 447 detects the load, thereby activating the inflator 426. As a result, the airbag 425 inflates toward the front of the seatback 405 and deploys toward the left side of the occupant. During this process, the bracket flat portion 456 is subjected to a rearward reaction force from the airbag 425, and the front edge of the bracket coupler portion 455 is subjected to a load toward the rear.

In the present embodiment, a front part of the bracket coupler portion 455 includes the bracket coupler slope section 458 extending frontward at an angle. Thus, when a rearward load is transferred and applied to the front edge of the bracket coupler portion 455, the bracket coupler slope section 458 counters the load, which securely prevents deformation of the bracket during airbag deployment, allowing the airbag to deploy more properly.

As shown in FIG. 16, the bracket coupler slope section 458 extends diagonally frontward from the left end of the bracket coupler contact section 457, which allows the bracket 450 to be fastened to the retainer 452 from the rear, unlike when the bracket coupler slope section 458 extends frontward from the outer end of the bracket coupler contact section 457. This feature enables the retainer 452 to be easily fastened to the bracket 450 even when the pad member 410 is positioned on the front side of the seatback frame 409. The feature also reduces the amount of protrusion of the bracket 450 and the retainer 452 from the outer side frames compared to the bracket coupler slope section 458 extending to the left, thereby reducing the lateral width of the vehicle seat 401.

As shown in FIG. 21, the stay cloth coupling section 468 is located frontward of the front edges of the retainer flat portion 471 and the bracket flat portion 456, which enables a worker to easily hang the hooks 492 onto the stay cloth coupling section 468, without being obstructed by the retainer flat portion 471 and the bracket flat portion 456.

The wire member 451 is latched into the hang holes 462 of the bracket 450 at the wire hook sections 465, supported on the side frame 417 in a cantilevered form, and held between the bracket 450 and the retainer 452 at the rear horizontal sub-section 486. Under this state, vibration applied to the vehicle seat 401 may cause the front end of the wire extension sections 466 and the stay cloth coupling section 468 to make a rocking motion and contact the side frame lower portion 417D, thereby causing abnormal noise. In the present embodiment, as shown in FIG. 16, the wire member 451 is curved outward to the left at the front horizontal sub-sections 488, and thus extends away from the side frame lower portion 417D. Thus, the front ends of wire extension sections 466 and the stay cloth coupling section 468 are located outward (to the left) of the wire hook sections and the hang holes, and are located away from the side frame lower portion 417D. As a result, the wire extension sections 466 and the stay cloth coupling section 468 are less likely to contact the side frame lower portion 417D, which prevents abnormal noise from occurring due to contact between the wire extension sections 466 together with the stay cloth coupling section 468 and the side frame lower portion 417D.

As shown in FIG. 16, the stay cloth coupling section 468 is brought into contact with the right side surface of the airbag module 412, resulting in that frictional force acts on the stay cloth coupling section 468, which prevents the stay cloth coupling section 468 from making a rocking motion. As a result, the stay cloth coupling section 468 is less likely to contact the side frame 417, which prevents abnormal noise from occurring due to contact between the stay cloth coupling section 468 and the side frame 417. In addition, in the present embodiment, the outer surface of the housing body 430, including the outer surface of the bottom wall 430A, is coated with a plastic material. In other words, the right side surface of the airbag module 412, which the stay cloth coupling section 468 may touch, is coated with the plastic material.

The feature reduces abnormal noise occurring due to contact between the stay cloth coupling section 468 and the right side of the side frame 417, compared to the case where the right side surface of the airbag module 412 is formed of metal.

In the above embodiments, the bracket front end section 459 of the bracket 450 is coupled to the side frame lower portion 417D, in addition to the coupling of the bracket coupler contact section 457 to the side frame lower portion 417D. This feature ensures the secure coupling between the bracket 450 and the side frame 417, which increases the stability of the direction of the airbag deployment.

Specific embodiments of the present invention are described above. However, those embodiments are non-limiting, and various modifications may be made to the embodiments without departing from the scope of the present invention. Although the embodiments in which a seat of the present invention is used as a seat in the second row of rear seats are described, those embodiments are non-limiting and the seat may be used as a seat in the third or subsequent rows of rear seats.

Figure 13:
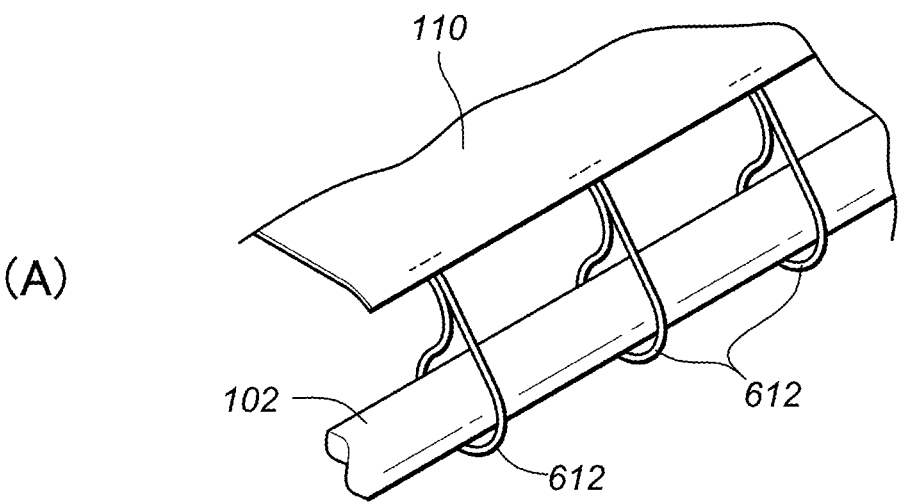
FIG. 13 is an explanatory diagram showing a stay cloth according to variants of the above-described embodiments, and (A) and (B) show first and second variants of the embodiments.
Figure 13:
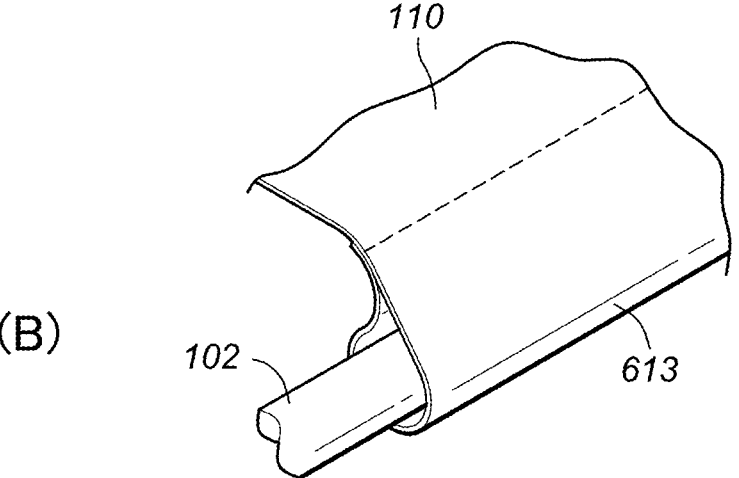

Although the embodiments in which the stay cloth 110 is provided with the J-shaped hooks 112 are described, those embodiments are non-limiting, and the stay cloth 110 may be provided annular-shaped hooks 612 as shown in FIG. 13(A). Alternatively, as shown in FIG. 13(B), the stay cloth 110 may be coupled to the cloth-hook wire 102 such that the stay cloth 110 is provided with a wire hole 613 at one end (the wire hole is formed by the folding and stitching of the edge of the stay cloth into a loop), and the cloth-hook wire 102 is provided to pass through the wire hole 613.

Figure 22:
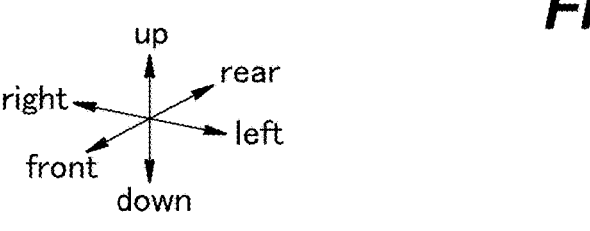
FIG. 22 is a perspective view of a vehicle rear seat in which the vehicle seat of the fourth embodiment of the present invention is provided.
Figure 23:
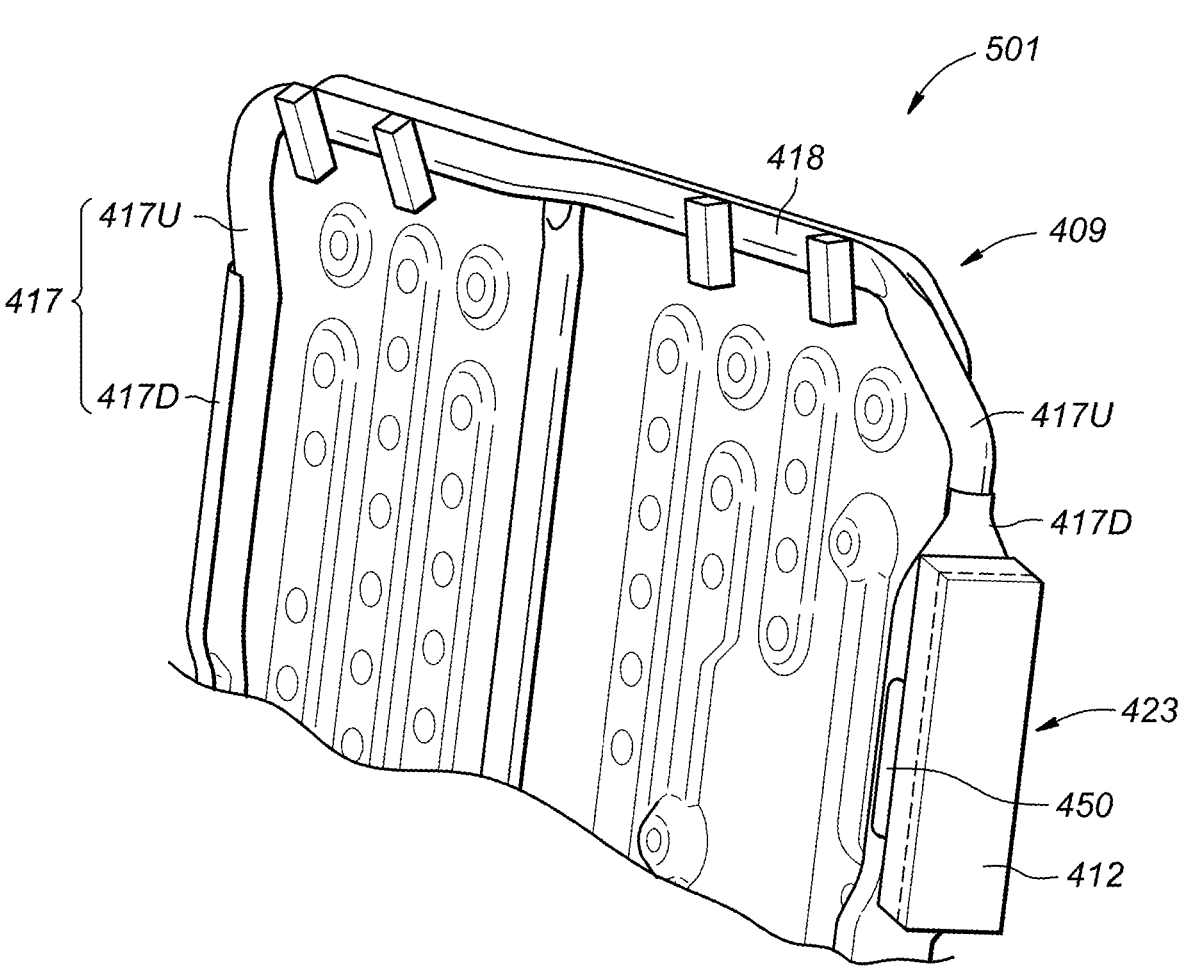
FIG. 23 is a perspective view of a seatback frame of the vehicle rear seat in which the vehicle seat of the fourth embodiment of the present invention is provided.

Although the embodiments in which the vehicle seat 401 is used as a front passenger seat of a vehicle are described, those embodiments are non-limiting. For example, a vehicle seat 501 of the present invention may be used as a seat in the second subsequent rows of rear seats, as shown in FIGS. 22 and 23.

Figure 24:
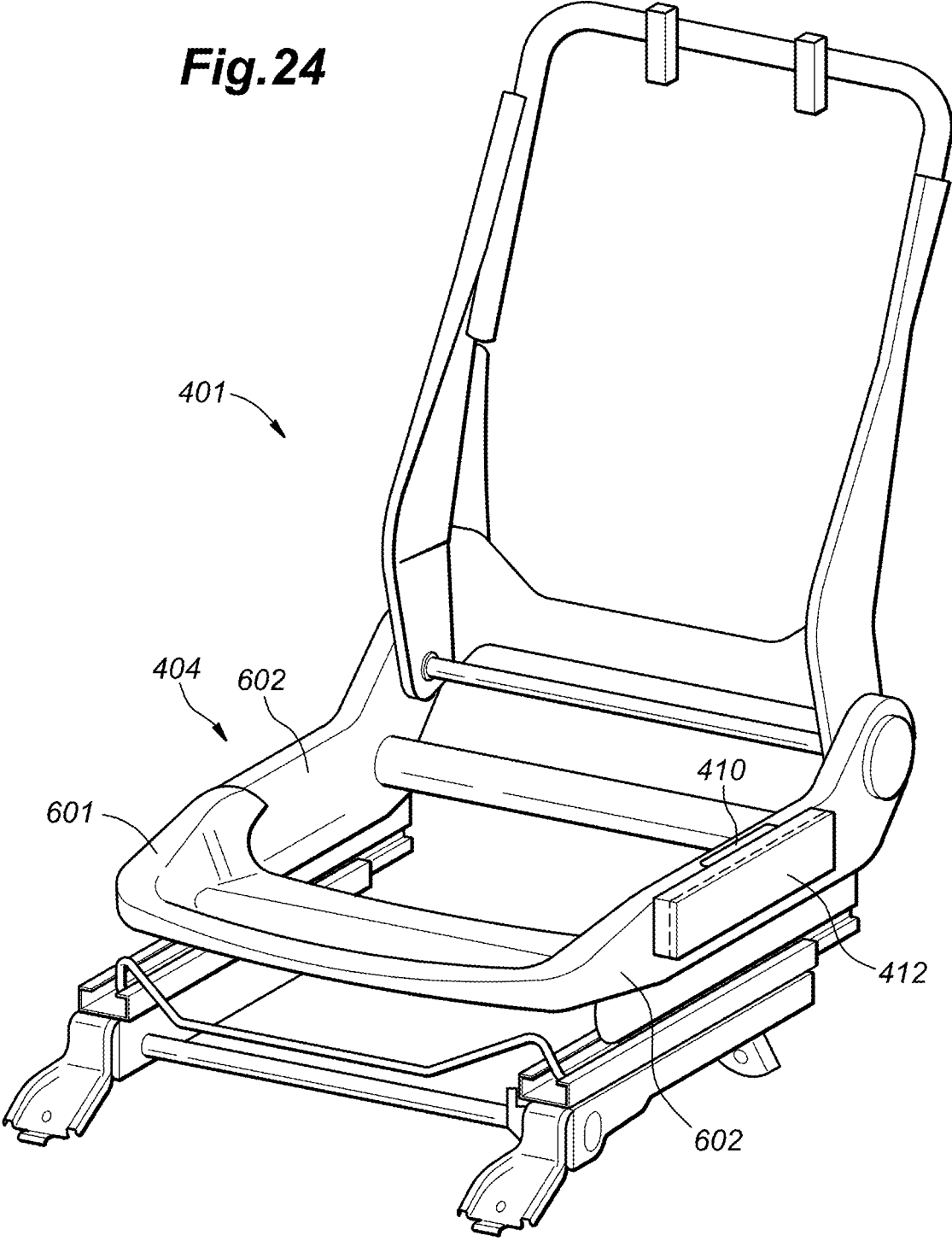
FIG. 24 is a perspective view of a seatback frame of a variant of the fourth embodiment of the present invention, in which an airbag module is provided in a seat cushion frame.

Although the embodiments in which the airbag module 412 is installed in the seatback 405 are described, those embodiments are non-limiting. For example, the airbag module 412 may be provided in the seat cushion 404 and coupled to a side frame 602 of a cushion frame 601 in the seat cushion 404, as shown in FIG. 24.

Although the embodiments in which the side frame lower portion 417D and the bracket 450 are formed as separate members are described, those embodiments are non-limiting, and the side frame lower portion 417D and the bracket 450 may be formed as a single component. For example, the bracket flat portion 456 and the bracket coupler portion 455 may be formed by the cutting up of the side wall of the side frame lower portion 417D. In this case, the side frame lower portion 417D and the bracket 450 are formed as a single piece, which reduces the number of parts of the vehicle seat 401, enabling the vehicle seat 401 to be made simple.

Although the embodiments in which the airbag module 23, 412 is coupled to the left side frame lower portion 26D, 417D are described, those embodiments are non-limiting, and any configuration is possible as long as the airbag module 412 is provided on at least one of the left and right side frames 26, 417. For example, the airbag module 23, 412 may be coupled to the right side frame lower portion 26D and 417D, or the airbag modules 23, 412 may be coupled to both the left and right side frame lower portions 26D, 417D.

Glossary

1 vehicle seat (first embodiment)
19 seatback frame outer portion (outer frame)
20 pan frame
26 side frame
26D side frame lower portion
27 upper frame
30 frame bend section
32 pan frame protrusion (protrusion section)
34 frame bracket
36 module bracket
80 shape former
81 shape former upper portion
81A curved section
82 shape former center portion
83 shape former lower portion
85 upper attachment section
89 bead
102 cloth-hook wire
110 stay cloth
201 vehicle seat (second embodiment)
280 shape former
282 shape former center portion
301 vehicle seat (third embodiment)
380 shape former V, W gap space
P fastening point
P1 fastening point
P2 fastening point
The invention claimed is:

1. A vehicle seat comprising:

an outer frame of a seatback frame, the outer frame forming a framework of a seatback and including a side part on one side in a left-right direction of the vehicle seat;

a frame bracket coupled to the side part of the outer frame;

an airbag module;

a module bracket fastened to the frame bracket and configured to support the airbag module; and a shape former coupled to the side part of the outer frame, the shape former being a member that forms an outer shape of the seatback, wherein one or more gap spaces are formed between the side part of the outer frame and the shape former, wherein the frame bracket and the module bracket are fastened to each other at one or more fastening points frontward of the gap spaces in a front-rear direction of the vehicle seat, and wherein a top or lower edge of the module bracket is visible from the rear through the gap spaces.

2. The vehicle seat as claimed in claim 1, wherein the module bracket and the frame bracket are fastened to each other at two or more fastening points, and wherein the two or more fastening points are located frontward of the gap spaces in the front-rear direction.

3. The vehicle seat as claimed in claim 1, wherein a top edge and a lower edge of the module bracket are visible from the rear through the gap spaces, wherein a top edge and a lower edge of the frame bracket are visible from the rear through the gap spaces, and wherein a vertical size of the module bracket is the same as that of the frame bracket.

4. The vehicle seat as claimed in claim 1, wherein the shape former is a curved wire member.

5. The vehicle seat as claimed in claim 1, further comprising a pan frame coupled to the rear side of the outer frame and including a protrusion section protruding from an upper portion of the pan frame on the one side in the left-right direction, the protrusion section extending outward beyond an upper portion of the side part of the outer frame, wherein the shape former includes a portion extending between a lower edge of the protrusion section and a lower portion of the side part of the outer frame, wherein a through-hole space extending in a front-rear direction of the vehicle seat is defined by the lower edge of the protrusion section, the shape former, and the lower portion of the side part of the outer frame, and wherein the frame bracket and the module bracket are fastened to each other at the one or more fastening points frontward of the through-hole space in the front-rear direction.

6. The vehicle seat as claimed in claim 5, further comprising a pad member that extends over and covers outer sides of the outer frame and the airbag module, wherein the shape former is in contact with an inner surface of the pad member.

7. The vehicle seat as claimed in claim 6, wherein the outer frame includes two side frames on the left and right sides thereof, and an upper frame connecting the two side frames, wherein the shape former includes a shape former upper portion and a shape former lower portion which are both connected to, and extend outward from a side frame, the side frame being one of the two side frames on the one side, and a shape former center portion connecting the shape former upper portion and the shape former lower portion, wherein the shape former upper portion is provided with an upper attachment section coupled to the side frame, and wherein the upper attachment section is located frontward of the protrusion section in the front-rear direction.

8. The vehicle seat as claimed in claim 7, wherein an inner end part of the shape former includes a curved section that is curved and extending downward, and wherein the upper attachment section is provided in the curved section.

9. The vehicle seat as claimed in claim 7, wherein the side frame has a bead, and wherein a lower end part of the shape former is joined to the side frame at a location rearward of the bead in the front-rear direction.

10. The vehicle seat as claimed in claim 7, wherein the side frame includes a side frame lower portion formed by a sheet metal member having left and right surfaces facing away from each other in the left-right direction, wherein the side frame lower portion includes a frame bend section in which the side frame lower portion is bent inward; and wherein a lower end part of the shape former is coupled to the side frame at a location below the frame bend section.

11. The vehicle seat as claimed in claim 7, wherein the shape former center portion of the shape former at least partially extends along an outer side surface of the airbag module, as viewed from the rear.

12. The vehicle seat as claimed in claim 7, wherein the shape former center portion of the shape former at least partially extends along an outer edge of the pan frame.

13. The vehicle seat as claimed in claim 6, further comprising:

a skin cover provided on an outer surface of the pad member;

a cloth-hook wire configured to be engagedly attached to the frame bracket; and a stay cloth configured to connect the cloth-hook wire to the skin cover, wherein the cloth-hook wire is engagedly coupled to the stay cloth at a location frontward of the through-hole space.

14. The vehicle seat as claimed in claim 6, wherein the shape former and the airbag module are arranged to be spaced apart from each other in the front-rear direction so as to form a gap space therebetween.

* * * * *